US009215402B2

(12) United States Patent
Towner et al.

(10) Patent No.: US 9,215,402 B2
(45) Date of Patent: Dec. 15, 2015

(54) VIDEO FORMAT FOR DIGITAL VIDEO RECORDER

(71) Applicant: Apple Inc., Cupertino, CA (US)

(72) Inventors: Paul Towner, Los Altos, CA (US); Courtney Kennedy, Sunnyvale, CA (US); Randy Ubillos, Los Altos, CA (US); Greg Mullins, Boulder Creek, CA (US); Greg Wallace, Palo Alto, CA (US); Peter Chou, Sunnyvale, CA (US); Xin Tong, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 14/247,099

(22) Filed: Apr. 7, 2014

(65) Prior Publication Data

US 2014/0301720 A1 Oct. 9, 2014

Related U.S. Application Data

(60) Division of application No. 12/781,813, filed on May 17, 2010, now Pat. No. 8,737,825, which is a continuation-in-part of application No. 12/636,699, filed on Dec. 11, 2009, now Pat. No. 8,554,061.

(60) Provisional application No. 61/241,394, filed on Sep. 10, 2009.

(51) Int. Cl.
*H04N 5/93* (2006.01)
*H04N 7/01* (2006.01)
(Continued)

(52) U.S. Cl.
CPC ............. *H04N 7/0117* (2013.01); *G11B 27/00* (2013.01); *H04N 5/765* (2013.01); *H04N 5/917* (2013.01); *H04N 19/107* (2014.11); *H04N 19/12* (2014.11);
(Continued)

(58) Field of Classification Search
None
See application file for complete search history.

(56) References Cited

U.S. PATENT DOCUMENTS 5,111,292 A 5/1992 Kuriacose et al.
5,577,191 A 11/1996 Bonomi
(Continued)

FOREIGN PATENT DOCUMENTS

AU 2010292204 5/2012
EP 1517561 3/2005
(Continued)

OTHER PUBLICATIONS

Updated portions of prosecution history of EP10763487.5, Jul. 10, 2014 (mailing date), Apple Inc.
(Continued)

*Primary Examiner* — William C Vaughn, Jr.
*Assistant Examiner* — Eileen Adams
(74) *Attorney, Agent, or Firm* — Adeli LLP

(57) ABSTRACT

Some embodiments provide a video recording device for capturing a video clip. The video recording device receives a selection of a non-temporally compressed encoding scheme from several different encoding schemes for encoding the video clip. The different encoding schemes include at least one temporally compressed encoding scheme and at least the selected non-temporally compressed encoding scheme. The video recording device captures the video clip as several frames. The video recording device non-temporally encodes each of the frames as several slices. The slices of a particular frame are for decoding by several processing units of a video decoding device. The video recording device stores the video clip in a storage.

17 Claims, 17 Drawing Sheets

(51) Int. Cl.

| | |
|---|---|
| *G11B 27/00* | (2006.01) |
| *H04N 5/765* | (2006.01) |
| *H04N 5/917* | (2006.01) |
| *H04N 19/176* | (2014.01) |
| *H04N 19/107* | (2014.01) |
| *H04N 19/12* | (2014.01) |
| *H04N 19/162* | (2014.01) |
| *H04N 19/174* | (2014.01) |
| *H04N 19/59* | (2014.01) |
| *H04N 19/11* | (2014.01) |

(52) U.S. Cl.
CPC ........... *H04N 19/162* (2014.11); *H04N 19/174* (2014.11); *H04N 19/176* (2014.11); *H04N 19/59* (2014.11); *H04N 19/11* (2014.11)

(56) References Cited

U.S. PATENT DOCUMENTS

| | | | |
|---|---|---|---|
| 6,078,617 A | 6/2000 | Nakagawa et al. | |
| 6,148,031 A | 11/2000 | Kato | |
| 6,958,757 B2 | 10/2005 | Karlov | |
| 7,110,025 B1 | 9/2006 | Loui et al. | |
| 7,221,391 B2 | 5/2007 | Yamagishi | |
| 7,528,840 B1 | 5/2009 | Carson et al. | |
| 8,018,465 B2 | 9/2011 | Carson et al. | |
| 8,554,061 B2 | 10/2013 | Mullins et al. | |
| 8,731,374 B2 | 5/2014 | Mullins et al. | |
| 8,737,825 B2 | 5/2014 | Towner et al. | |
| 2001/0004417 A1* | 6/2001 | Narutoshi et al. | 386/52 |
| 2003/0123546 A1 | 7/2003 | Falik et al. | |
| 2003/0156188 A1* | 8/2003 | Abrams, Jr. | 348/51 |
| 2004/0184534 A1* | 9/2004 | Wang | 375/240.03 |
| 2005/0094870 A1 | 5/2005 | Furukawa et al. | |
| 2005/0105624 A1 | 5/2005 | Kato et al. | |
| 2005/0122539 A1 | 6/2005 | Sugimoto | |
| 2005/0259731 A1 | 11/2005 | Kawai et al. | |
| 2006/0082652 A1 | 4/2006 | Sugiyama | |
| 2006/0110153 A1 | 5/2006 | Yanagida et al. | |
| 2006/0133476 A1 | 6/2006 | Page et al. | |
| 2006/0268117 A1 | 11/2006 | Loui et al. | |
| 2007/0074269 A1 | 3/2007 | Hua | |
| 2007/0166007 A1 | 7/2007 | Hirai | |
| 2008/0013622 A1* | 1/2008 | Bao et al. | 375/240.1 |
| 2008/0247600 A1 | 10/2008 | Date et al. | |
| 2008/0307311 A1* | 12/2008 | Eyal | 715/733 |
| 2009/0123066 A1* | 5/2009 | Moriya et al. | 382/166 |
| 2009/0238479 A1* | 9/2009 | Jaggi et al. | 382/236 |
| 2009/0257502 A1 | 10/2009 | Ye et al. | |
| 2009/0320082 A1 | 12/2009 | Collazo | |
| 2010/0275122 A1* | 10/2010 | Buxton et al. | 715/728 |
| 2011/0255609 A1* | 10/2011 | Lynch et al. | 375/240.26 |

FOREIGN PATENT DOCUMENTS

| | | |
|---|---|---|
| EP | 2063645 | 5/2009 |
| EP | 2476256 | 7/2012 |
| EP | 2733703 | 5/2014 |
| JP | 2004-187161 | 7/2004 |
| JP | 2005-094549 | 4/2005 |
| JP | 2008-118271 | 5/2008 |
| JP | 2009-021775 | 1/2009 |
| JP | 2009-130452 | 6/2009 |
| WO | WO 2007/082167 | 7/2007 |
| WO | WO 2011/031902 | 3/2011 |

OTHER PUBLICATIONS

Updated portions of prosecution history of AU2010292204, Sep. 4, 2014 (mailing date), Apple Inc.
Portions of prosecution history of U.S. Appl. No. 10/677,574, Mar. 24, 2009, Carson, Kenneth M., et al.
Portions of prosecution history of U.S. Appl. No. 12/416,080, Jul. 14, 2011, Carson, Kenneth M., et al.
Portions of prosecution history of U.S. Appl. No. 12/636,699, Sep. 9, 2013, Mullins, Greg, et al.
Portions of prosecution history of U.S. Appl. No. 13/480,399, Apr. 22, 2014, Mullins, Greg, et al.
Portions of prosecution history of U.S. Appl. No. 12/781,813, May 9, 2014, Towner, Paul, et al.
Invitation to Pay Additional Fees and Partial International Search Report for PCT/US2010/048324, Dec. 6, 2010 (mailing date), Apple Inc.
International Search Report and Written Opinion for PCT/US2010/048324, Feb. 3, 2011 (mailing date), Apple Inc.
International Preliminary Report on Patentability and Written Opinion for PCT/US2010/048324, Mar. 13, 2012 (date of issuance), Apple Inc.
Portions of prosecution history of EP10763487.5, Oct. 8, 2013 (mailing date), Apple Inc.
Portions of prosecution history of EP14155183.8, May 26, 2014 (mailing date), Apple Inc.
Portions of prosecution history of AU2010292204, Jul. 31, 2014 (mailing date), Apple Inc.
Cooper, Nigel, "Camcorder Info Base", Month Unknown, 2005, 3 pages, DVuser, available at http://www.dvuser.co.uk/camcorders.php.
Author Unknown, "HD Editing Software & Systems", Oct. 2006, 13 slides, HDcompare.com, available at http://www.hdcompare.com/Editing_Systems.htm.

* cited by examiner

VIDEO FORMAT FOR DIGITAL VIDEO RECORDER

CLAIM OF BENEFIT TO PRIOR APPLICATIONS

This application is a divisional application of U.S. patent application Ser. No. 12/781,813, entitled "Video Format for Digital Video Recorder", filed May 17, 2010, now issued as U.S. Pat. No. 8,737,825. U.S. patent application Ser. No. 12/781,813 is a continuation in part of U.S. patent application Ser. No. 12/636,699, entitled "Video Format for Digital Video Recorder", filed Dec. 11, 2009, now issued as U.S. Pat. No. 8,554,061. U.S. patent application Ser. No. 12/636,699 claims the benefit of U.S. provisional application Ser. No. 61/241,394, entitled "Video Format for Digital Video Recorder", filed Sep. 10, 2009. U.S. patent application Ser. No. 12/781,813, now issued as U.S. Pat. No. 8,737,825, U.S. Pat. No. 8,554,061, and U.S. Provisional Application 61/241,394, are incorporated herein by reference.

FIELD OF THE INVENTION

The invention is directed towards video recording. Specifically, the invention is directed towards a video format for a digital video recorder.

BACKGROUND OF THE INVENTION

Digital video recorders are commonly used to record digital video for transfer to a computer. Once on the computer, users may edit, enhance, and share the digital video. However, today's digital video recorders compress digital video using forms of encoding that use temporal compression. That is, the compressed video includes predictive (P) and bidirectional (B) frames that are not actual images, and instead are only mathematical data representing the difference between an index (I) frame that is encoded as an image.

Temporal compression enables compression of digital video to smaller file sizes on the camera, but creates a multitude of problems for users that want to transfer the video to their computers in order to work with the video. Because the P and B frames are only defined by reference to other frames, they must be transcoded in order for a user to edit them. This transcoding generally takes place upon import of the digital video from the camera.

FIG. 1 illustrates a prior art system with a video camera 105 and a computer 110. The video camera 105 captures and stores a video file 115 having a size X. This video is encoded using temporal compression. Upon transfer from camera 105 to computer 110, the video must be transcoded (to remove the temporal compression) and stored. The resulting file 120 has a size of 3× to 10×, and thus is much larger than the original file on the camera. Because of these expansions, it does not take that much video for the size of the file to become prohibitive for most users. Furthermore, the transcoding is a time- and computation-intensive process. Transferring 30 minutes of video can take 90 minutes due to the transcoding. Accordingly, there exists a need for a video camera with the capability to record video that is not temporally compressed without sacrificing quality or creating excessively large file sizes.

SUMMARY OF THE INVENTION

Some embodiments of the invention provide a video recording device (e.g., a video camera) that captures and stores digital video in a format that is not temporally compressed. The captured digital video is stored at a desired particular resolution and/or bit rate while maintaining a desired video quality.

When the digital video is exported from the recording device to a computer (e.g., for editing, sharing, etc.), the video is transferred quickly with no transcoding necessary. Transcoding, in some embodiments, involves decoding the video upon import to remove any temporal compression and then re-encoding the video without temporal compression. As such, when the video does not need to be transcoded, the digital video is stored on the computer in its native format.

In some embodiments, the video recording device provides users with an option of storing video that is either temporally compressed or not temporally compressed. The temporally compressed video includes interframe encoded video pictures (e.g., frames) that are encoded at least partially by reference to one or more other video pictures. The non-temporally compressed video includes only intraframe encoded video pictures (e.g., frames) that are encoded without reference to any other video pictures.

Some embodiments include non-temporally compressed enhanced-definition and/or high-definition formats at a manageable bit rate. The various video formats are presented through a user interface of the digital video recorder. In some embodiments, the various different video formats all use the same encoding standard. That is, the temporally compressed and non-temporally compressed formats use the same encoding standard.

Some embodiments provide a media-editing application with the capability to recognize the format of incoming video. When incoming digital video (e.g., from a video recording device as described above) is temporally compressed, the media-editing application transcodes the digital video. When the digital video is not temporally compressed, the media-editing application stores the video without transcoding or expanding the size of the video. Thus, the non-temporally compressed digital video can be imported very quickly because there is no transcoding.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION OF THE INVENTION

In the following description, numerous details are set forth for purpose of explanation. However, one of ordinary skill in the art will realize that the invention may be practiced without the use of these specific details. For instance, some of the examples illustrate specific encoding modules. One of ordinary skill in the art will recognize that different encoding modules are possible without departing from the invention.

Some embodiments of the invention provide a video recording device that captures and stores digital video in a format that is not temporally compressed. The captured digital video is stored at a desired particular resolution and/or bit rate while maintaining a desired video quality. When the digital video is exported from the camera to a computer, the digital video is stored on the computer in its native format with no transcoding.

Figure 1:
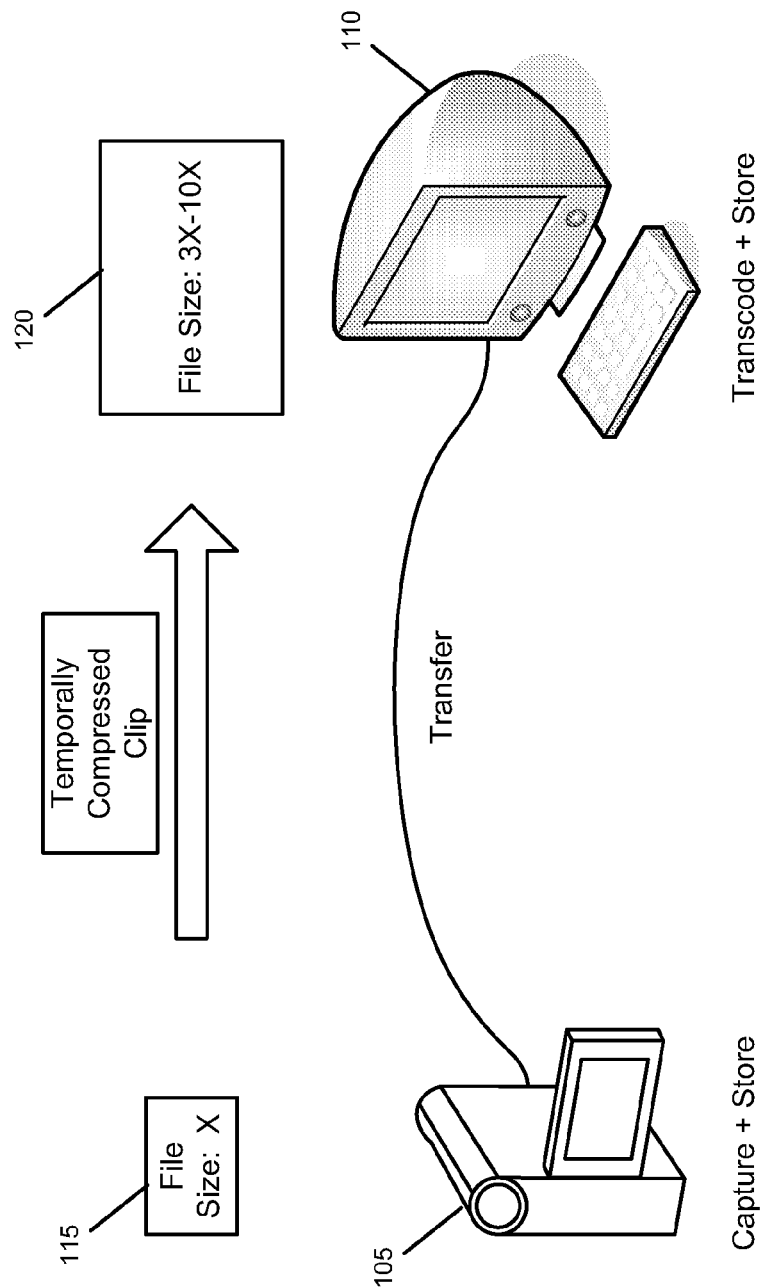
FIG. 1 illustrates a prior art system with a video camera and a computer.
Figure 2:
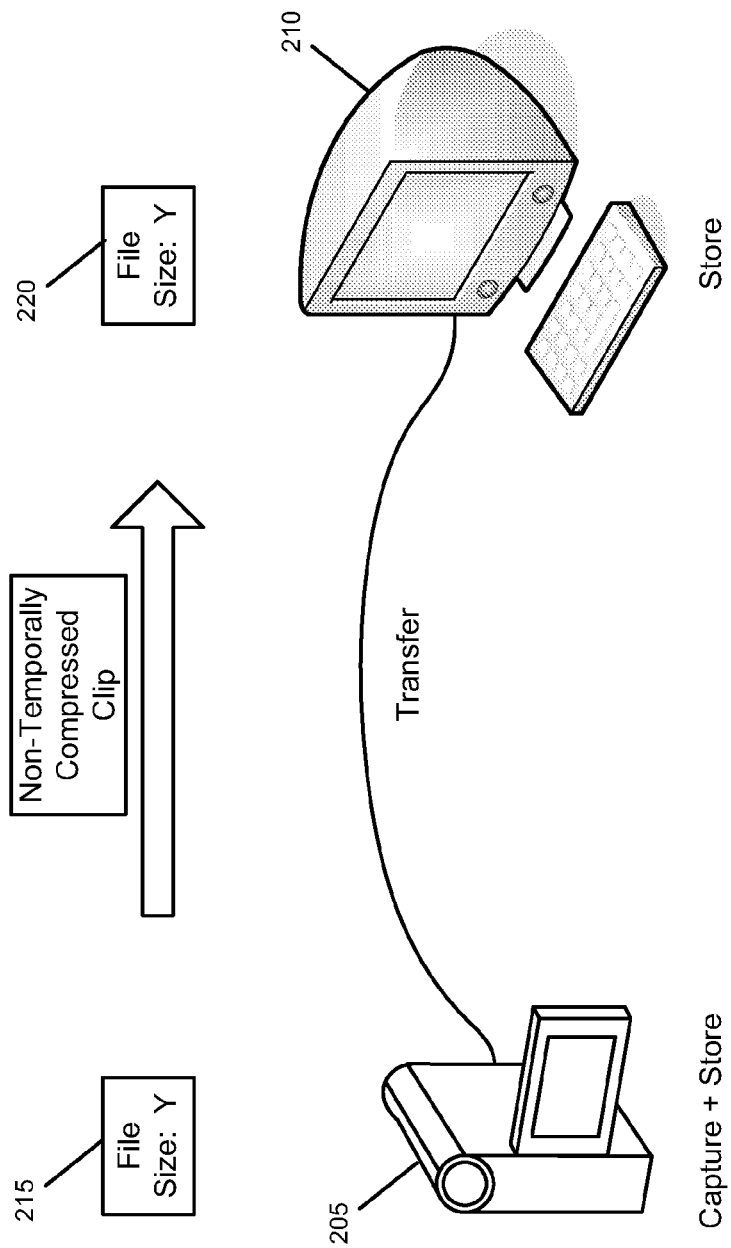
FIG. 2 illustrates a system of some embodiments that includes a digital video camera and a computer.
Figure 3:
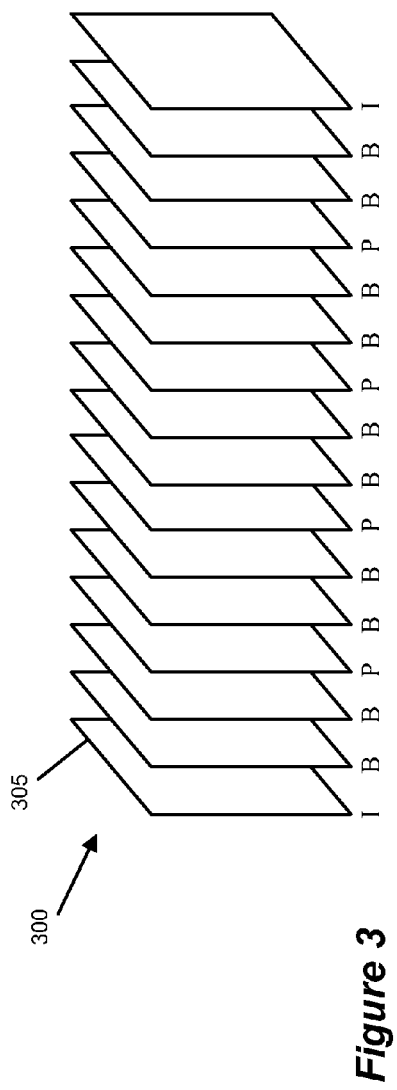
FIG. 3 illustrates a sequence of digital video pictures that are encoded using temporal compression.
Figure 4:
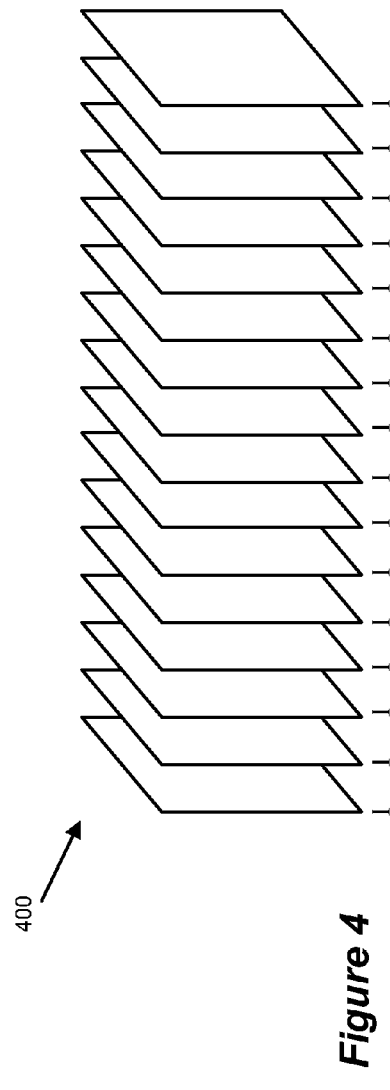
FIG. 4 illustrates a sequence of digital video pictures that is encoded without using temporal compression.

FIG. 2 illustrates a system including a digital video camera 205 and a computer 210. The digital video camera captures and stores a video file 215 that has a size Y. The video file 215 is not temporally compressed. That is, each digital video picture (i.e., frame or field) in the video file is encoded without reference to other digital video pictures. FIGS. 3 and 4, described below, illustrate different frame types. The non-temporally compressed video clip is transferred (e.g., via USB, FireWire, or other wired or wireless connection) from the video camera 205 to the computer 210. As described below, the computer 210 may include a media-editing application for editing and enhancing the video. The computer 210 stores the video clip in its native format as video file 220. This video file 220 has the same size Y as the video file 215 on the camera.

No transcoding needs be performed upon import as there is no temporal compression to remove. Not only does this result in the file having the same size, but the transfer time is only limited by the size of the file and the speed of the connection between the camera 205 and the computer 210. When transcoding needs to be performed, the promise of faster transfer that is supposed to come with random access camera storage (i.e., hard disks, flash memory, etc.) is nullified by the slow transcoding process.

As mentioned above, the video recording device of some embodiments stores digital video in a format that is not temporally compressed. The non-temporally compressed video includes only intraframe encoded digital video pictures (e.g., frames) that are encoded without reference to any other digital video pictures. By comparison, FIG. 3 illustrates a sequence 300 of digital video pictures that is temporally compressed. Temporally compressed video includes interframe encoded digital video pictures (e.g., frames) that are encoded at least partially by reference to one or more other video pictures. FIG. 3 illustrates I-frames (intra-frames that are not encoded by reference to any other frames), P-frames (predictive frames that are encoded by reference to previous frames), and B-frames (bidirectional frames that are encoded by reference to previous and future frames).

The sequence 300 includes an I-frame, then two B-frames, then a P-frame, then two more B-frames, etc. The sequence from the I-frame 305 through the fifteenth total frame is known in some embodiments as a Group of Pictures (GOP). In this case, the GOP size is fifteen. Each GOP starts with an I-frame.

Some embodiments, rather than using I-, P-, and B-frames for temporal compression, use I-, P-, and B-slices for temporal compression. Each digital video picture (e.g., frame) of some embodiments includes numerous macroblocks, each of which is a 16×16 array of pixel values. A slice is a group of consecutive macroblocks. Rather than determine how to encode the macroblocks on a picture-by-picture basis, some embodiments make this decision on a slice-by-slice basis instead. Moreover, when decoding a video image that has been encoded on a slice-by-slice basis, each slice can be decoded independently of each other.

FIG. 4 illustrates the case in which a sequence of video pictures 400 is not temporally compressed. Instead, every video picture in the sequence 400 is an I-frame, defined without reference to the other frames. Although this format is not as compressed on the camera as that of sequence 300, sequence 400 does not need to be transcoded upon transfer to a computer and can be edited much more easily than a temporally compressed sequence.

Some embodiments provide a media-editing application with the ability to recognize the format of incoming digital video. The media-editing application only transcodes the digital video if the video is temporally compressed. When the digital video is not temporally compressed, the media-editing application stores the video without transcoding or expanding the size of the video.

I. Digital Video Camera

As noted above, some embodiments provide a video recording device (e.g., a digital video camera) that captures and stores digital video in a format that is not temporally compressed. Some embodiments provide users with the option of recording video that is either temporally compressed or not temporally compressed. This option is presented in the user interface of the video camera in some embodiments.

A. User Interface

Figure 5:
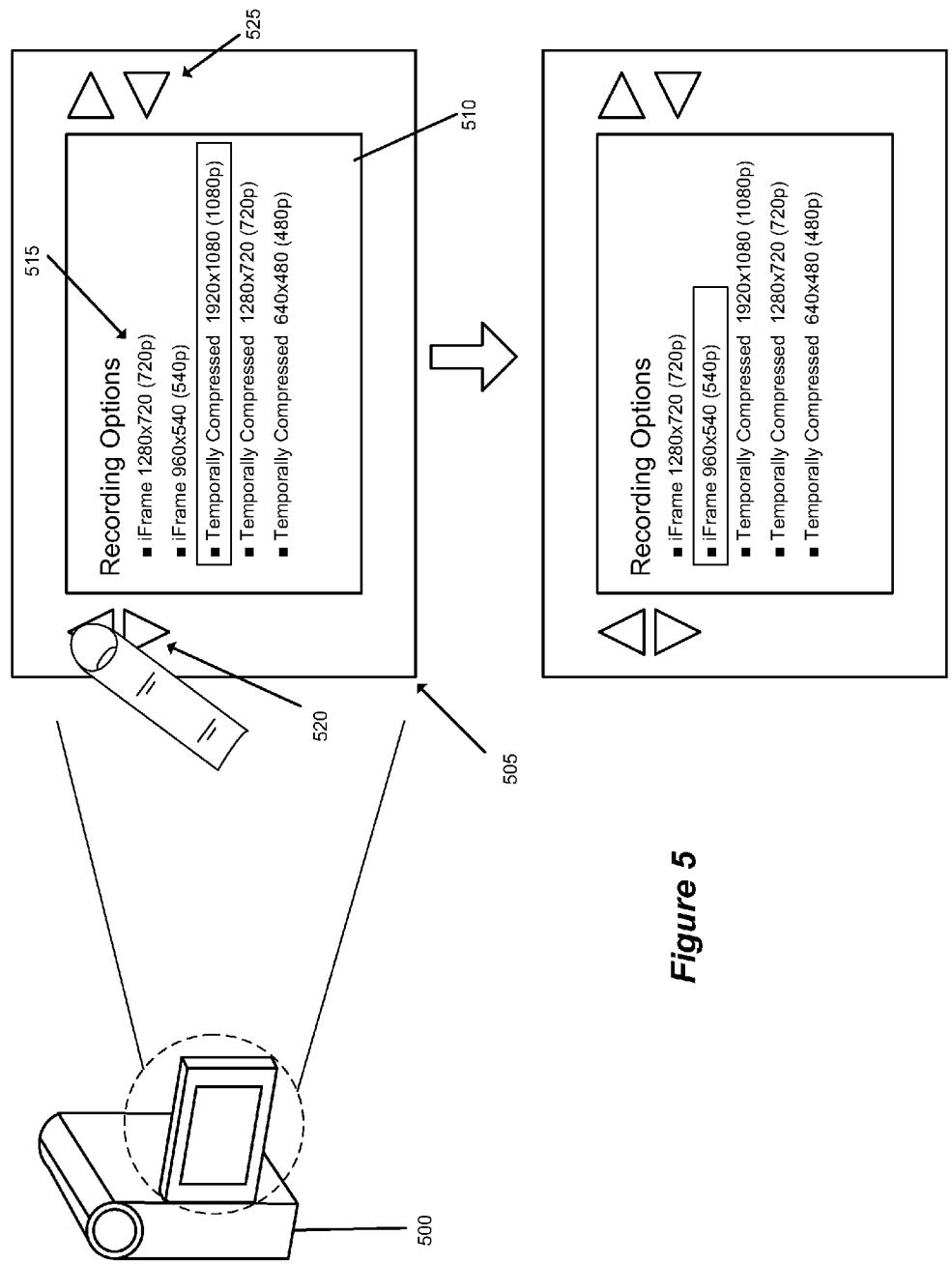
FIG. 5 illustrates a user interface of a video camera of some embodiments that allows a user to select a video format option for a captured video.

FIG. 5 illustrates a user interface of a video camera that allows a user to select a video format option for a captured video. Specifically, this figure shows the user interface of the video camera at two different stages: a first stage that is before a user's selection of the iFrame video format option and a second stage that is after its selection. As shown, the video camera 500 includes a user interface 505 with a display screen 510 for displaying a graphical user interface (GUI) that includes a menu 515. The graphical user interface may be entirely textual, entirely graphical, or a combination thereof. The user interface 505 also includes several user-selectable controls 520 and 525.

The menu 515 displays a list of video format options. These options include several iFrame (i.e., non-temporally compressed) options at different resolutions (i.e., iFrame 960×540, iFrame 1280×720) and several temporally compressed format options. The format options in the menu range from high definition to enhanced definition; however, the menu may exclude one or more options or include other options (e.g., iFrame 640×480). Some embodiments only include one non-temporally compressed option (e.g., 1280× 720).

As mentioned above, some embodiments provide a 960× 540 iFrame recording format option. This recording format has a vertical resolution of 540p. This resolution is advantageous for a number of reasons, one of which is that often the resolution corresponds to the native resolution of the camera's sensor and can be easily upconverted (e.g., by a computer used to edit the video) to HD standards such as 720p, 1080i, or 1080p.

The user-selectable controls 520 and 525 on the video camera allow a user to navigate the menu 515. In particular, the controls 520 are for navigating the menu 515 vertically, while controls 525 are for navigating the menu horizontally. In the example illustrated in FIG. 5, these controls are provided as physical controls on the video camera. However, in some embodiments, such navigation controls may be provided as part of the graphical user interface displayed on a display screen. Alternatively, or conjunctively, the video camera 500 may be equipped with a touch screen that allows the user to directly select a video format option using the touch screen without having to use such physical controls as controls 520 and 525.

The operations of the user interface will now be described by reference to the two different stages that are illustrated in FIG. 5. In the first stage, the display screen 510 displays the menu 515. The currently selected recording format is a temporally compressed option (1080p). A user of the video camera interacts with the menu 515 through the controls 520 and 525. Specifically, the user selects the top control of controls 520 in order to move the selected option upwards by one item in the menu and change the video format option from a temporally compressed format to an iFrame format.

As shown in stage two, once the user selects the top control of controls 520, the menu 515 highlights the iFrame format option (i.e., iFrame 960×540). This highlighting provides the user with a visual indication of the selection of the iFrame format option. Now that the user has selected the iFrame format option, subsequently captured video clips will be recorded without temporal compression at the specified resolution.

Figure 6:
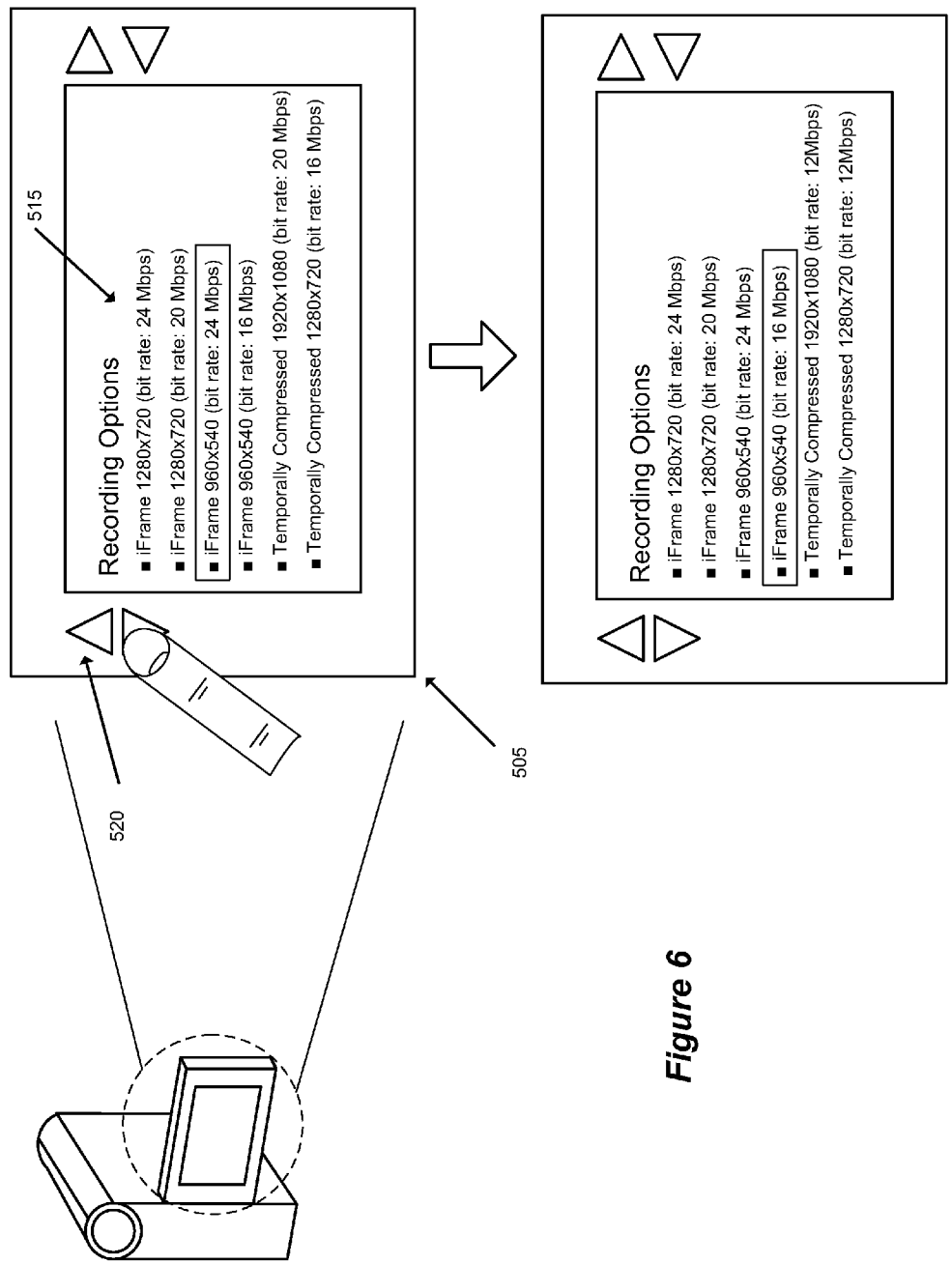
FIG. 6 illustrates a user interface of a video camera of some embodiments that allows a user to specify bit rate settings for a captured video.

In the previous example, the menu 515 displays a list of different video format options for encoding a sequence of captured video frames using different encoding schemes and resolution. In some embodiments, the menu 515 displays one or more other options for specifying other encoding formats. FIG. 6 illustrates the user interface 505 that allows a user to specify not only resolution and encoding scheme but also bit rate. The bit rate for video, in some embodiments, is the size of the video file per playback time. In general, higher bit rate will lead to higher quality video if the resolution is kept equal. However, higher bit rates also mean larger files, which can be cumbersome for a user to work with.

This figure is similar to the previous figure; however, the menu 515 displays multiple iFrame format options at the same resolution with different bit rate settings. Specifically, the menu 515 displays two different bit rate settings (i.e., two of 24 Mbps, 20 Mbps, or 16 Mbps) for each of the two iFrame resolutions (i.e. iFrame 960×540, iFrame 1280×720). As shown, without changing the iFrame resolution, the user selects the bottom control of controls 520 to change the bit rate setting from 24 Mbps to 16 Mbps. In some embodiments, a media-editing application to which the camera will eventually transfer the video has a maximum specified bit rate (e.g., 24 Mbps). In some embodiments, the menu 515 of the video camera may allow a user to select other video encoding options. For example, the menu 515 may display selectable frame rate options (e.g., 25 or 30 frames per second).

B. Architecture

Figure 7:
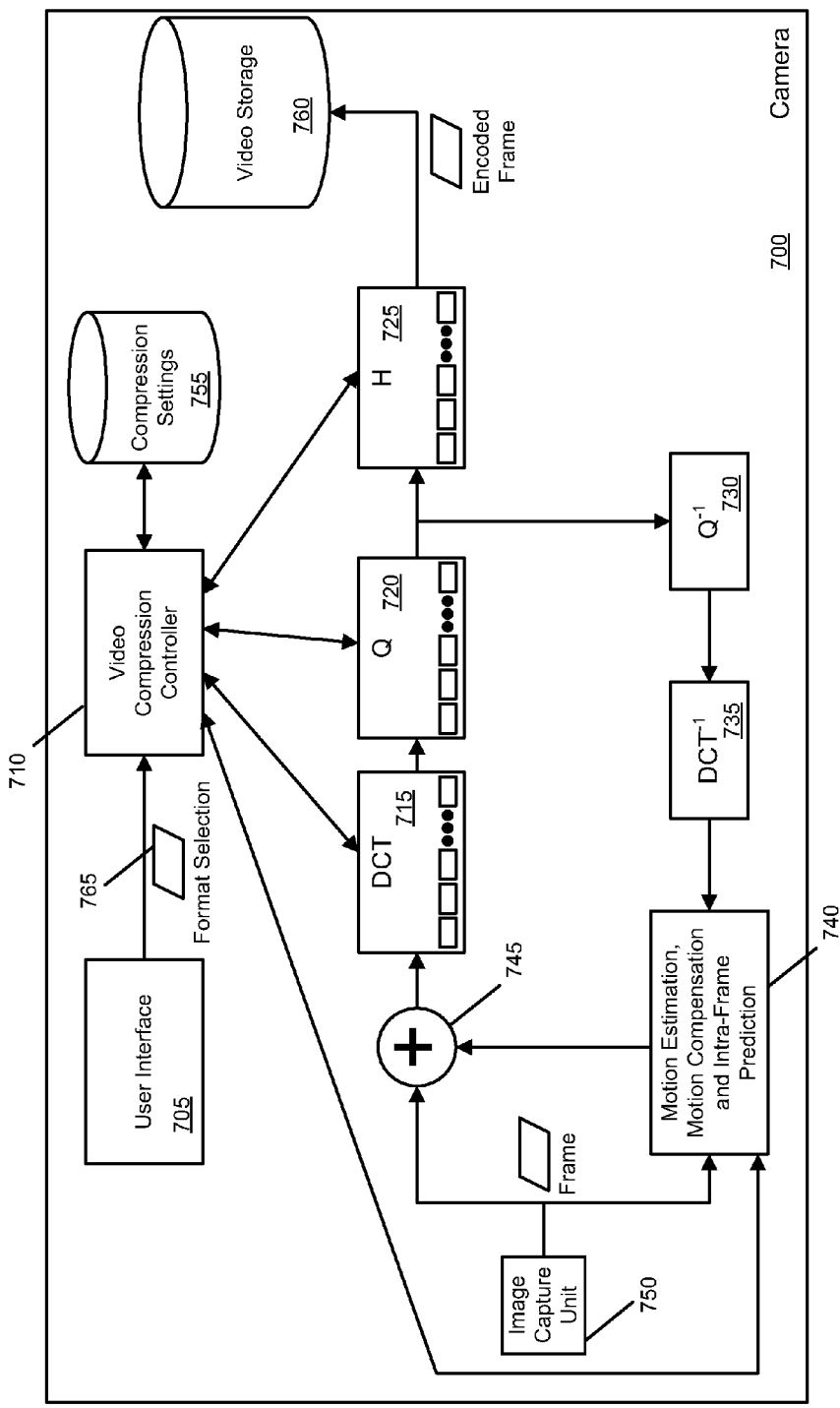
FIG. 7 illustrates the software architecture of a digital video camera of some embodiments for capturing, encoding, and storing digital video.

FIG. 7 illustrates the software architecture of a digital video camera 700 for capturing, encoding, and storing digital video. Digital video camera 700 includes a user interface 705, a video compression controller 710, a discrete cosine transform (DCT) unit 715, a quantizer unit 720, an entropy encoder 725, an inverse quantizer unit 730, an inverse discrete cosine transform (IDCT) unit 735, a motion compensation, motion estimation, and intra-frame prediction unit 740, an adder 745, and an image capture unit 750.

The camera also includes a storage for compression settings 755 and a video storage 760. In some embodiments, the two storages are the same physical storage. In other embodiments, the two storages are separate physical storages in the camera or are different partitions of the same physical storage. The video storage 760 is a digital tape in some embodiments. In other embodiments, video storage 760 is a non-volatile storage, such as magnetic disk storage (e.g., hard disk) or solid-state memory (e.g., flash memory). In some embodiments, the video storage 760 is a random access storage like flash memory. Examples of flash memory include Secure Digital (SD), CompactFlash (CF), Memory Stick (MS), among other types of flash memory. When the storage 760 is a random access storage, a user (e.g., a user of a computer to which the video camera is attached) can choose to access a second video clip before a first video clip, even if the second video clip is recorded after the first video clip. Different embodiments of the video storage 760 can be configured to store data (e.g., captured digital video) using different file systems such as file allocation table (FAT), hierarchical file system (HFS), extended file allocation table (exFAT), and other different types of file systems.

The user interface 705 of camera 700 includes both the graphical user interface as illustrated on display 510 in the preceding figures as well as user input controls such as controls 520 and 525 illustrated in the same figures. The graphical user interface may be a text-only interface or may include graphics as well.

As illustrated above, users input format selection information through the user interface 705. By choosing a compression type (temporal or non-temporal), a resolution, and/or a bit rate, the user determines the format for subsequently recorded video. This format selection information 765 is transferred from the user interface to the video compression controller 710.

The video compression controller 710 instructs the various compression and encoding modules how to perform encoding for the specified format. The video compression controller extracts compression settings from storage 755 based on the selected format. These compression settings are then transferred to the various compression and encoding modules so that they can properly encode the video in the specified format. FIG. 7 illustrates that the video compression controller instructs the DCT unit 715, the quantizer unit 720, the entropy encoder 725, and the motion estimation, motion compensation, and intra-frame prediction unit 740. In some embodiments, information similar to that given to the DCT and quantizer units 715 and 720 is also passed to inverse quantizer and IDCT units 730 and 735.

Image capture unit 750 captures video. For more detail on the video capture process, refer below to FIG. 15. In some embodiments, the video is captured at a rate of 25 or 30 frames per second. This is a user option in some embodiments and a non-changeable setting in other embodiments. Each captured frame is essentially an image captured by the video camera. A captured frame is sent from the imager to the compression and encoding modules 715-745 so that the frame can be encoded.

DCT unit 715 performs discrete cosine transforms on blocks of image data resulting from the addition or subtraction performed at the adder 745. The discrete cosine transform operation achieves compression by removing some spatial redundancy that exists within a block of image data. The operation transforms a block of image data into a two dimensional array of DCT coefficients in which most of the energy of the block is typically concentrated in a few low frequency coefficients.

Quantizer unit 720 applies quantization on the DCT coefficients produced by the DCT unit 715. The quantization operation achieves compression of the DCT coefficients by compressing a range of values to a single quantum value. Quantization causes loss of quality, and thus some embodiments use a quantization matrix to minimize loss of image quality by assigning smaller quantization steps to certain frequencies of DCT coefficients.

Entropy encoder 725 converts input data into variable length codes. In some embodiments, the input data comes directly from the quantizer unit 720. In other embodiments, intermediate operations such as zig-zag scanning and run-length encoding are performed between the quantizer unit 720 and entropy encoder 725. The entropy encoder 725 of some embodiments achieves compression by assigning shorter length code words to values that have a higher probability of occurring than for values that have a lower probability of occurring (e.g., Context-based Adaptive Variable Length Coding). Some embodiments use coding schemes such as Huffman or UVLC in which entropy coding is performed on a symbol by symbol basis. Other embodiments use coding schemes such as arithmetic coding in which an entire block of data is encoded as a single number (e.g., Context-based Adaptive Binary Arithmetic Coding). The entropy encoder outputs an encoded frame which can be stored in video storage 760.

Some embodiments perform spatial or temporal prediction to achieve further compression of video images. To facilitate this, some embodiments include a video decoding path so the encoder can use the same decoded reference frames used by a decoder to perform prediction. The decoding path includes inverse quantizer unit 730 and inverse DCT unit 735; these units perform the inverse operations of quantizer unit 720 and DCT unit 715 as described above.

The motion estimation, motion compensation, and intra-frame prediction unit 740 performs motion estimation, motion compensation, and intra-frame prediction operations. The motion compensation operation is part of the decoding path; it uses temporal prediction information to compensate the output of the inverse DCT unit 735 in order to reconstruct and decode a video image. The motion estimation operation is part of the encoding path; it searches other decoded frames for a matching block of pixels to create motion vectors for use in temporal prediction. Intra-frame prediction has an encoding component and a decoding component. The decoding component of the intra-frame prediction operation uses spatial prediction information to reconstruct and decode a video image. The encoding component of the intra-frame prediction operation searches the current decoded frame for a matching block of pixels for use in spatial prediction. In some embodiments, the unit 740 will only perform spatial intra-frame prediction when instructed to not perform temporal compression.

The adder 745 computes the difference between the image from the image capture unit 750 and the output of the motion estimation, motion compensation and intra-frame prediction unit 740. The resulting difference (or summation) is then sent to DCT unit 715 to be encoded as mentioned above.

The operation of each of the DCT, quantizer, and entropy encoder units 715-725 is determined by numerous different variables. Each of these variables may be set differently depending on the specified video format. Thus, the DCT operation is controlled not by one particular setting in some embodiments, but rather by a multitude of different choices. In some embodiments, these are design choices by the camera manufacturer that are intended to maximize video quality at a particular resolution and bit rate. Similarly, the quantizer and entropy encoder operations are also controlled by a multitude of different choices in some embodiments that are design choices for each particular format intended to maximize video quality at the particular resolution and bit rate. For example, the quantization matrix used by the quantizer may be modified based on the video format.

When the video compression controller 710 specifies settings for non-temporally compressed video, the motion estimation, motion compensation, and intra-frame prediction unit 740 is instructed to only perform intra-frame prediction rather than the motion estimation and motion compensation operations that are part of temporal compression. On the other hand, when the video compression controller specifies settings for temporally compressed video, unit 740 performs motion estimation and motion compensation in addition to intra-frame prediction.

Furthermore, in some embodiments the video compression controller 710 performs rate control during the encoding process in addition to specifying the encoding variables to the different modules. To perform rate control, the controller 710 calculates, after the encoding of each frame, the proximity of the encoded video picture to a target bit rate (i.e., the specified bit rate for the video format). The controller 710 then adjusts the compression variables (e.g., the variables of the DCT unit 715 and quantizer unit 720) on the fly to adjust the size of the to-be-encoded frame. In some embodiments, the manner in which these changes are made are part of the compression settings specified by the selected video format.

While many of the features of camera 700 have been described as being performed by one module (e.g., the video compression controller 710), one of ordinary skill would recognize that the functions might be split up into multiple modules, and the performance of one feature might even require multiple modules. Similarly, features that are shown as being performed by separate modules might be performed by one module in some embodiments.

Figure 8:
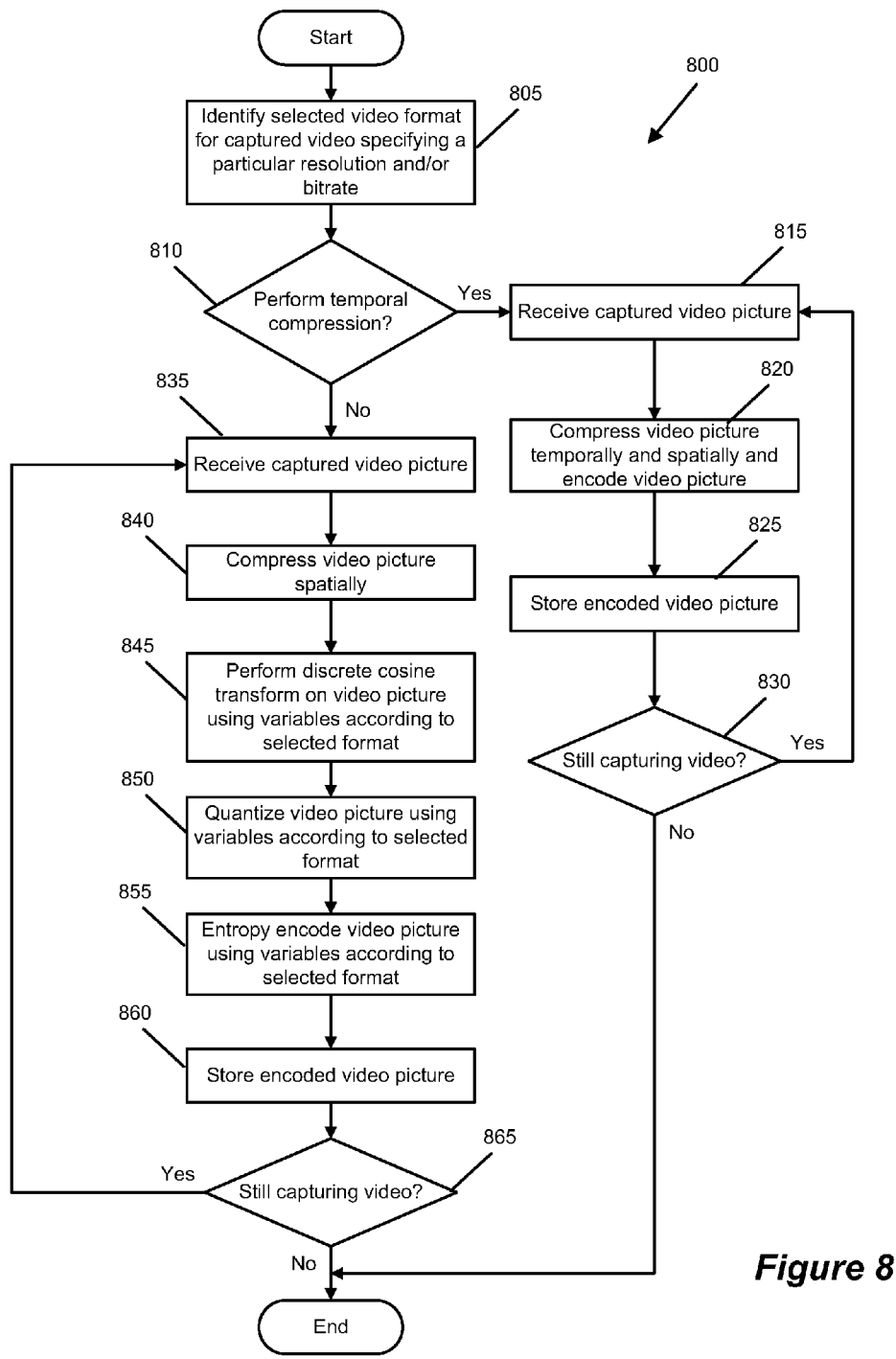
FIG. 8 conceptually illustrates a process of some embodiments for capturing and storing video on a digital video camera that has the capability to store either temporally compressed or non-temporally compressed video.

FIG. 8 conceptually illustrates a process 800 of some embodiments for capturing and storing video on a digital video camera that has the capability to store either temporally compressed or non-temporally compressed video (e.g., camera 700). Process 800 begins by identifying (at 805) a selected video format for captured video that specifies a particular resolution and/or bit rate. This video format is selected by a user in some embodiments through a user interface, as illustrated in FIGS. 5 and 6.

Process 800 determines (at 810) whether to perform temporal compression on a video clip that is presently being captured. This determination is made based on the selected video format. When the user has selected an iFrame recording mode, no temporal compression is performed. On the other hand, when the user has selected a different recording mode (e.g., AVC HD 1080p), temporal compression is required.

When temporal compression is required, the process receives (at 815) the next captured video picture. The process then compresses (at 820) the video picture both spatially and temporally and encodes (at 820) the video picture. This operation is performed by the various encoding modules 715-745 in some embodiments. The process then stores (at 825) the encoded video picture in a storage of the camera. Next, process 800 determines (at 830) whether the camera is still capturing video (that is, whether there are any more frames of video to compress and encode). When the camera is no longer capturing video, the process ends. Otherwise, the process returns to 815 to receive the next captured video picture.

When temporal compression is not required for the presently captured video clip, the process receives (at 835) the next captured video picture. The process then compresses (at 840) the video picture spatially. In some embodiments, this operation is performed by unit 740, though only intra-prediction is used. As the video picture is not being compressed temporally, no motion estimation or motion compensation need be performed.

Next, process 800 performs (at 845) a discrete cosine transform on the video picture using variable according to the selected format. That is, the discrete cosine transform is performed using variables sent to the discrete cosine transform unit 715 by the video compression controller 710 in some embodiments. These are variables selected (in some embodiments, as a design choice by the camera manufacturer) to produce high-quality video at a desired resolution and/or bit rate without performing temporal compression on the video.

The process then quantizes (at 850) the video picture (the output of the DCT unit) using variables according to the selected format. That is, the quantization is performed using variables sent to the quantizer unit 720 by the video compression controller 710 in some embodiments. These are variables selected (in some embodiments, as a design choice by the camera manufacturer) to produce high-quality video at a desired resolution and/or bit rate without performing temporal compression on the video.

The process then entropy encodes (at 855) the video picture (the output of the quantizer unit and any intermediate modules such as a run-length encoder) using variables according to the selected format. That is, the entropy encoding is performed using variables sent to the entropy encoder 725 by the video compression controller 710 in some embodiments. These are variables selected (in some embodiments, as a design choice by the camera manufacturer) to produce high-quality video at a desired resolution and/or bit rate without performing temporal compression on the video.

Process 800 next stores (at 860) the encoded video picture in a storage of the camera. Next, process 800 determines (at 865) whether the camera is still capturing video (that is, whether there are any more frames of video to compress and encode). When the camera is no longer capturing video, the process ends. Otherwise, the process returns to 835 to receive the next captured video picture.

C. Exemplary Video Processing Configuration

The above section describes numerous aspects of a video recording device of some embodiments that captures and stores digital video in a format that is not temporally compressed. The following section describes aspects of a non-temporally compressed video processing configuration of some embodiments and various processes performed by such a configuration. In some embodiments, the configuration is determined based on design choices by the camera manufacturer that are intended to maximize video quality at a particular resolution and bit rate and to decrease the decoding time of the video, among other design objectives.

Different video processing techniques can be employed to increase the video quality (or decrease the bit rate) of non-temporally compressed video. One such technique is to reduce the width of the video resolution from a selected resolution (e.g., iFrame 1280×720) before the video is encoded. As such, some embodiments of the exemplary configuration reduce video resolution width reduction in order to increase video quality or and/or reduce the bit rate of the encoded video.

Figure 9:
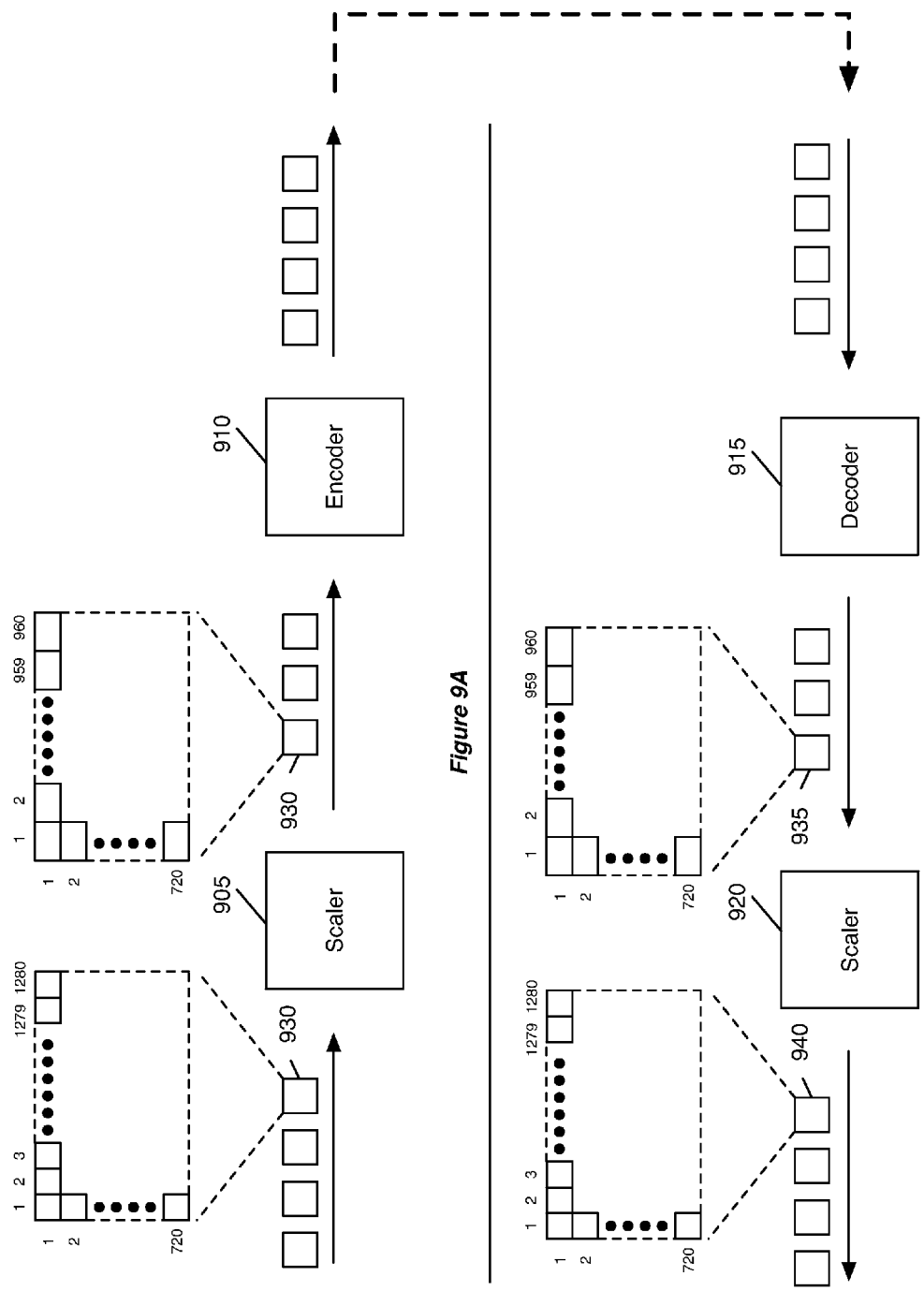
FIG. 9A conceptually illustrates an example of video resolution width reduction of some embodiments.
FIG. 9B conceptually illustrates an example of video resolution width increase of some embodiments.

FIG. 9A conceptually illustrates an example of video resolution width reduction of some embodiments. In this example, it is assumed that the selected recording option is iFrame 1280×720. FIG. 9A shows video images (e.g., image 925 and image 910) at various stages of a video processing operation performed by a scaler 905 and an encoder 910. In some embodiments, the encoder 910 can be implemented by video encoder 1520 of FIG. 15, described below. As shown, the unencoded video images, which have a resolution of 1280×720 (e.g., the image 925), are input into the scaler 905. The scaler 905 reduces (i.e., scales) the width of the resolution of the video images, which now have a resolution of 960×720 (as shown for image 930), and outputs the video images to the encoder 910 to be encoded. In some embodiments, when the scaler 905 reduces the width of the resolution of the video images, it also stretches the pixels widthwise so that the aspect ratio of the video is maintained. This is illustrated in FIG. 9A by the depiction of the pixels of the image 925 as squares and the pixels of the image 930 as rectangles.

Some embodiments of the exemplary configuration also increase the width of the video resolution after it is decoded. For example, some such embodiments increase the video resolution width back to the width at which the video was originally captured. FIG. 9B conceptually illustrates an example of video resolution width increase of such embodiments. FIG. 9B shows video images (e.g., image 935 and image 940) at various stages of a video processing operation performed by a decoder 915 and a scaler 920. In some embodiments, the decoder 915 can be implemented by video decoder 1540 of FIG. 15, described below.

Continuing with the example illustrated in FIG. 9A, when the encoded video images in FIG. 9A are to be decoded (e.g., by media editing application 1600, described below), they are sent to decoder 915. After the video images are decoded, scaler 920 increases (i.e., scales) the width of the resolution of the video images before the video images are stored and/or displayed. As shown by image 935, the decoded video images have a resolution of 960×720 before the scaler 920 processes them. Since the video images were originally captured at a resolution of 1280×720, the scaler 920 increases the width of the resolution of the decoded video images back to the 1280×720 resolution as illustrated by image 940. In some embodiments, when the scaler 920 increases the width of the resolution of the video images, it also shrinks the pixels widthwise so that the aspect ratio of the video is maintained. FIG. 9B illustrates this by the depiction of the pixels of the image 935 as rectangles and the pixels of the image 940 as squares.

The example above describes video that is captured at the full selected recording resolution (i.e., the image sensor of the video recording device captures video images at a resolution of 1280×720). In some embodiments, the video recording device does not capture the full selected recording resolution. Rather, these embodiments capture video at a resolution that is lower that the selected recording resolution and perform video resolution width increase after the video is decoded. For example, referring to the above example, some such embodiments capture video at a resolution of 960×720. When the video is decoded, the video resolution is increased to 1280×720 as illustrated in FIG. 9B.

Although the example illustrated in FIGS. 9A and 9B shows scaling video images captured at a resolution of 1280× 720 to 960×720 before the video images are encoded and scaling the video images from 960×720 back to 1280×720 after the video images are decoded, different embodiments scale the video images to different sizes. For example, some embodiments may capture video at a resolution of 1920× 1080, scale the video images to 960×720 before encoding the video images, and scale the video images to 1280×720 after the video images are decoded. Other embodiments may not scale the video images after the video images are decoded.

In addition, some embodiments not only scale the width of the video images' resolution, but also scale the height of the video images' resolution. Some embodiments scale the video images proportionally while other embodiments scale the video images anamorphically. In some embodiments, determining whether to scale video images before encoding and after decoding, to what resolution the video images are scaled before being encoded, and to what resolution to video images are scaled after being decoded (e.g., when video is played on the video recording device itself) are design choices made by camera manufacturers that are intended to maximize video quality at a particular resolution and bit rate. Furthermore, some embodiments insert metadata into a video image indicating its original pre-scaled resolution so that a video playback device (e.g., a computer, smartphone, etc.) can use this information in scaling the video images for playback.

An additional method of reducing the bit rate (or increasing video quality) of non-temporally compressed video is to perform transforms on an 8×8 macroblock basis during the encoding of the video. As shown above in FIG. 7 and described in the relevant sections, video captured by image capture unit 750 is processed on a picture-by-picture basis (i.e., frame-by-frame basis). In particular, the DCT 715 processes the images of the video on a frame-by-frame basis. That is, the DCT 715 receives image data for an entire frame from the adder 745 and performs a discrete cosine transform on the image data, which is then output to the quantizer 720.

Figure 10:
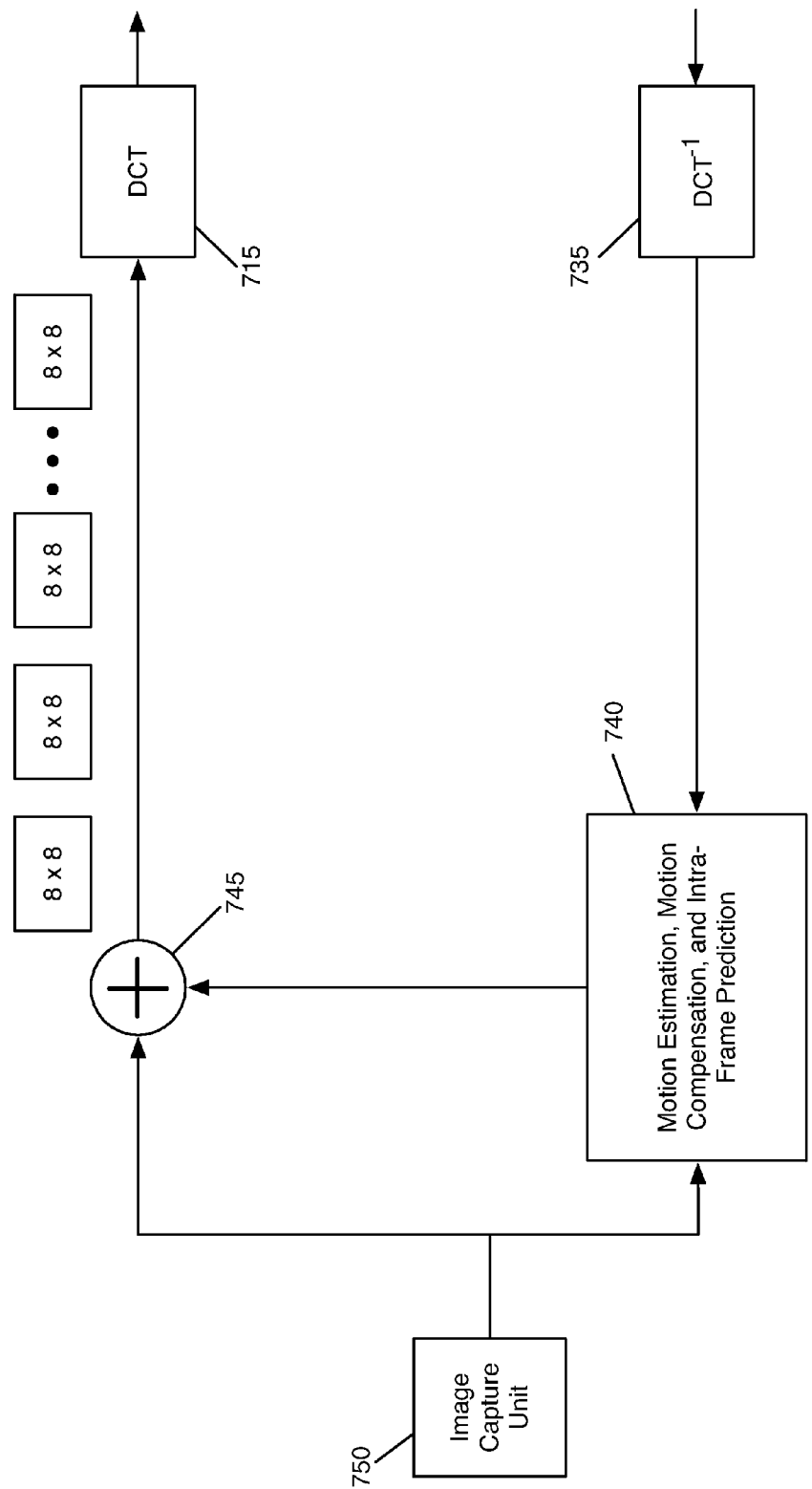
FIG. 10 conceptually illustrates performing transforms on 8×8 macroblocks during the encoding of video of some embodiments.

In some embodiments of the exemplary configuration, the DCT 715 is configured to perform discrete cosine transforms on 8×8 size macroblocks. FIG. 10 conceptually illustrates performing transforms on 8×8 macroblocks during the encoding of video. As shown, the DCT 715 receives image data for an 8×8 macroblock in the form of an 8×8 matrix from the adder 745, performs a discrete cosine transform on the image data, and outputs the data transformed data to the quantizer 720 (not shown). However, other embodiments of the exemplary configuration may perform discrete cosine transforms on different macroblock sizes such as 16×16.

Yet another method of reducing the bit rate (or increasing the video quality) of non-temporally compressed video is to perform all intra prediction modes when encoding the video. Some embodiments of the exemplary configuration use the conventional H.264 codec standard for intra prediction encoding the video images while other embodiments of the exemplary configuration do not perform any intra prediction encoding at all. Instead, these embodiments encode the video using only intra mode encoding. In some embodiments, intra mode encoding is encoding without the use of any intra prediction modes.

As discussed above, in some embodiments, a video is comprised of a sequence of video frames where each frame is comprised of multiple macroblocks. A macroblock is typically a 16×16 array of pixels (although other sizes of macroblocks are also possible such as 8×8 macroblocks discussed above) and is divided into partitions (such as partitions of 4×4 pixel arrays). Under the H.264 codec standards, when intra prediction encoding a frame, there are nine different ways to encode a 4×4 array (i.e., there are nine intra 4×4 prediction modes). The nine modes are:

0. Intra_4×4_Vertical
1. Intra_4×4_Horizontal
2. Intra_4×4_DC
3. Intra_4×4_Diagonal_Down_Left
4. Intra_4×4_Diagonal_Down_Right
5. Intra_4×4_Vertical_Right
6. Intra_4×4_Horizontal_Down
7. Intra_4×4_Vertical_Left
8. Intra_4×4_Horizontal_Up Each 4×4 array is encoded in only one prediction mode. Typically, the prediction mode that results in a lowest cost will be selected. Cost is typically equal to the distortion (where distortion reflects the difference between original pixel values and encoded predictive values) or the weighted average of distortion and a bit number produced by the prediction mode (where an increase in distortion and/or bit number increases the cost). An exhaustive search among all nine prediction modes can be performed to determine the optimal prediction mode (the select prediction mode) having the lowest cost. Some embodiments apply searching heuristics to select an intra prediction mode instead of performing an exhaustive search among the nine prediction modes.

Figure 11:
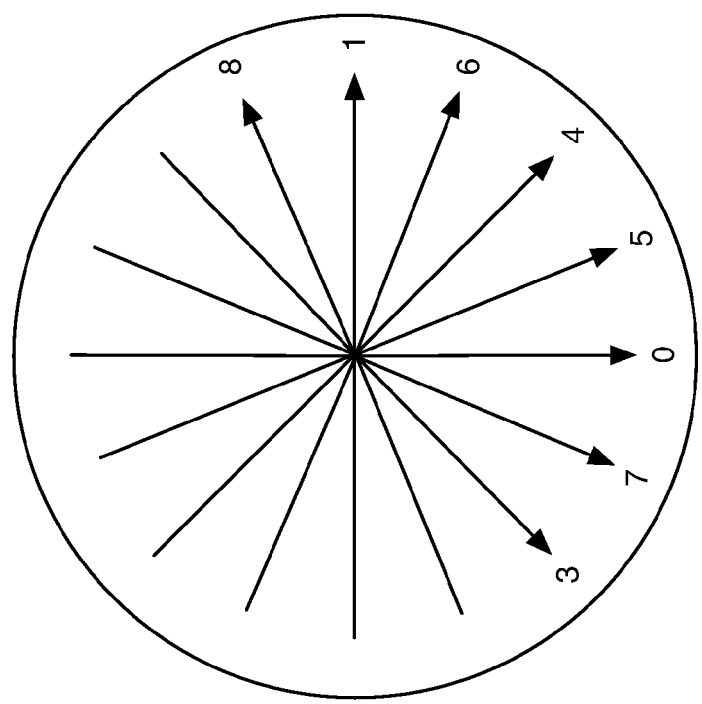
FIG. 11 conceptually illustrates the direction of prediction for intra prediction modes of some embodiments.

FIG. 11 conceptually illustrates the directions of prediction for the nine intra prediction modes noted above. For a currently processed 4×4 array, predictive modes under the H.264 standard indicate the position (relative to the currently processed 4×4 array) of another 4×4 array (referred to herein as the predictive array) that is to be the basis of the predictive information encoded for the currently processed array. For example, predictive mode 0 (Vertical) indicates that the predictive array for a currently processed array is located above the currently processed array and predictive mode 1 (Horizontal) indicates that the predictive array for a currently processed array is located to the left of the currently processed array.

Moreover, there are various ways of decreasing the decoding time of non-temporally compressed video. As noted above, when a video image has been encoded on a slice-by-slice basis, each slice of the video image can be decoded independently of the other slices. Accordingly, one way of decreasing the decoding time of non-temporally compressed video is to encode video images on a slice-by-slice basis so that a computing device that has multiple processors can independently and simultaneously decode the slices of the video images.

Figure 12:
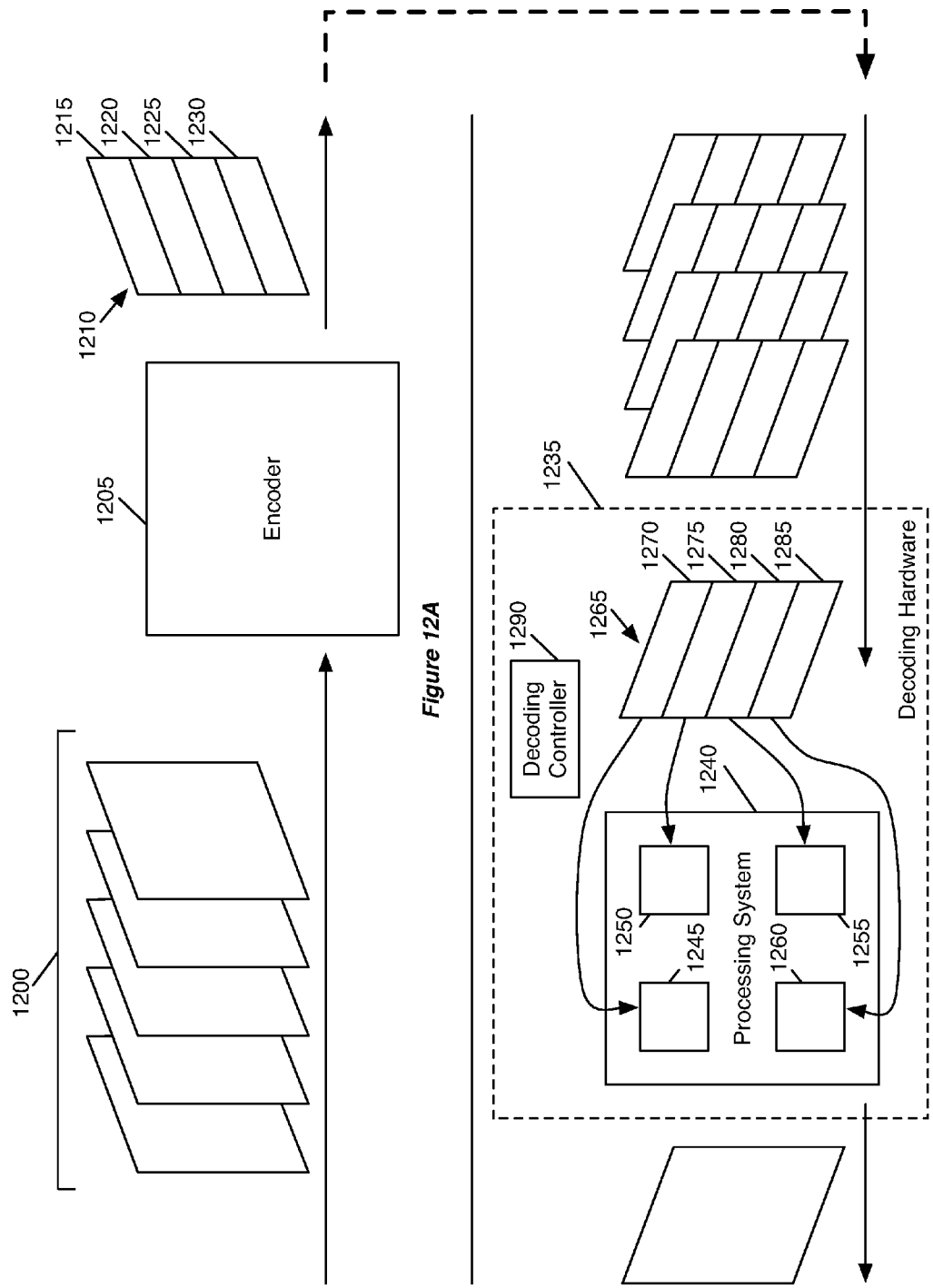
FIG. 12A conceptually illustrates video images encoded on a slice-by-slice basis of some embodiments.
FIG. 12B conceptually illustrates video images decoded on a slice-by-slice basis of some embodiments.

FIG. 12A conceptually illustrates video images encoded on a slice-by-slice basis of some embodiments. As shown, this figure shows video images 1200 that have not been processed by an encoder 1205. In some embodiments, the encoder 1205 can be implemented by the video encoder 1520 of FIG. 15, described below. In this example, the encoder 1205 is configured to divide the video images into four slices and encode the video images on a slice-by-slice basis. Image 1210 conceptually illustrates a video image that has been divided into four slices. As illustrated, the image 1210 is divided into four sections 1215-1230. However, the manner in which the sections 1215-1230 are divided is for illustrative purposes only. Other embodiments of the encoder 1205 can divide the image 1210 into any number of sections and in any number of different shapes and sizes.

Since each slice of a video image encoded on a slice-by-slice basis can be decoded independently, a computing device (e.g., computer, smartphone, etc.) with multiple processors can decode multiple slices simultaneously. FIG. 12B conceptually illustrates the decoding hardware of one such computing device. This figure shows a decoding hardware 1235 that includes a processing system 1240 and a decoding controller 1290. In some embodiments, the decoding hardware 1235 can be implemented by video decoder 1540 of FIG. 15, described below.

The processing system 1240 includes four processing units 1245-1260 (processors, cores, processing cores, etc.). In some embodiments, the processing units 1245-1260 are implemented as cores on a single die while in other embodiments the processing units 1245-1260 are implemented as chips in a single package. In yet other embodiments, the processing units 1245-1260 are implemented as multiple packages in a single system. The decoding controller 1290 of some embodiments is responsible for allocating or assigning slices of a video image to the processing units 1245-1260 for decoding. As such, when the decoding hardware 1235 identifies that a video frame is encoded on a slice-by-slice basis and identifies the slices of the video frame, the decoding controller 1290 allocates or assigns the identified slices to one or more of the processing units 1245-1260 for decoding. In some embodiments, the decoding controller 1290 can be implemented by one or more of the processing units 1245-1260 while in other embodiments the decoding controller 1290 can be implemented by a separate hardware component.

Continuing with the example illustrated in FIG. 12A, the video images that were divided into four slices and encoded on a slice-by-slice basis are sent to the decoding hardware 1235 for decoding. The slices of each video image are identified and assigned to a processing unit of processing system 1240 for decoding. As shown, video image 1265 includes four slices 1270-1225. The decoding controller 1290 assigns slice 1270 to processing unit 1245, slice 1275 to processing unit 1250, slice 1220 to processing unit 1255, and slice 1225 to processing unit 1260. As each slice can be decoded independently of the others, assigning a different processing unit of processing system 1240 to each of the slices 1270-1225 allows the slices 1270-1225 of video image 1265 to be independently and simultaneously decoded. Accordingly, this decoding technique results in decreased decoding time in some embodiments.

In FIG. 12B, each slice in a video image is simultaneously and independently decoded by a single processor of processing system 1240. However, different embodiments can allocate or assign different numbers of processors to decode a slice of the video images. For example, some embodiments may assign two processing units of processing system 1240 to decode each slice of the video image. As such, at most two slices of a video image can be simultaneously decoded at a given time by the illustrated processing system 1240. Other embodiments may allocate all the processing units 1245-1260 of processing system 1240 to decode each slice of the video image. In such embodiments, only one slice can be decoded at a time. Determining the number of slices into which the video images are divided and the shape and size of the slices are design choices made by camera manufacturers with the intent to decrease the decoding time of video.

Figure 13:
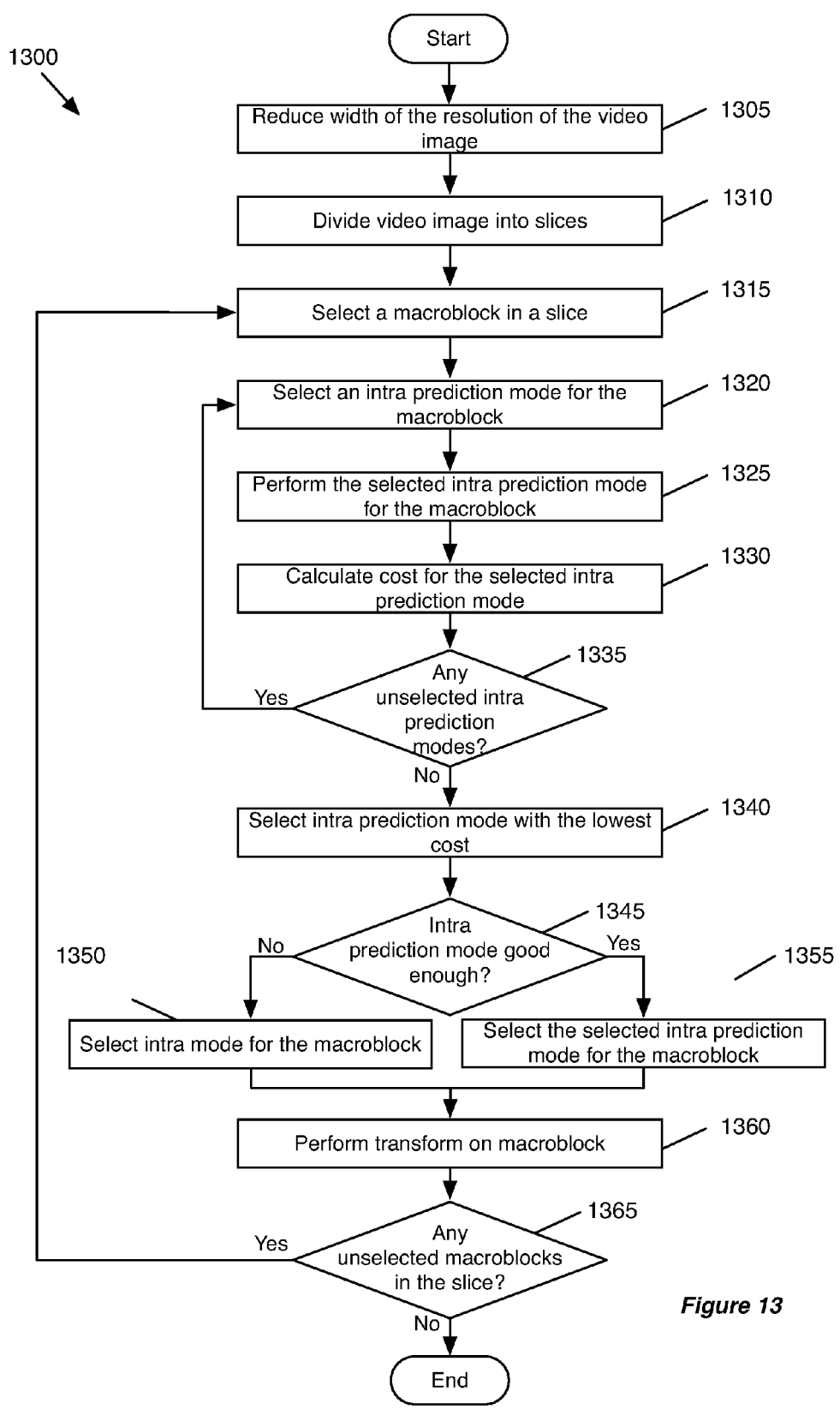
FIG. 13 illustrates a process of some embodiments for performing non-temporally encoding a video.

FIG. 13 illustrates a process 1300 of some embodiments of the exemplary configuration for non-temporally encoding a video. In some embodiments, the motion estimation, motion compensation, and intra-frame prediction unit 740, described above, performs at least a portion of the process 1300. In some embodiments, the process 1300 can be performed by the video encoder 1520, described below.

For a video image in the video, the process starts by reducing (at 1305) the width of the resolution of the video image. The operation 1305 can be performed as described above by reference to FIG. 9A. Next, the process 1300 divides (at 1310) the video image into a number of slices as discussed above by reference to FIG. 12A. The process 1300 then selects (at 1315) a macroblock in one of the slices. After, the process 1300 selects (at 1320) an intra prediction mode for the selected macroblock and performs (at 1325) the selected prediction mode. The process 1300 then calculates (at 1330) a cost for the selected intra prediction mode as described above.

Next, the process determines (at 1335) whether any unselected intra prediction modes are left. If unselected intra prediction modes remain, the process returns back to operation 1320 to continue performing the other unselected intra prediction modes. If there are no unselected intra prediction modes left, the process 1300 selects (at 1340) the intra prediction mode with the lowest calculated cost.

At 1345, the process 1300 determines whether the selected intra prediction mode is good enough. In some embodiments, the selected intra prediction mode is good enough when the overhead cost of encoding the macroblock using the selected intra prediction mode is less than the cost of encoding the macroblock using intra mode. The cost of encoding the macroblock using the selected intra prediction mode includes an overhead cost that is not included in intra mode. In some embodiments, encoding the macroblock using intra mode is encoding the macroblock without the use of any intra prediction modes.

If the process 1300 determines that the selected intra prediction mode is not good enough, the process 1300 selects (at 1350) intra mode as the encoding mode for the macroblock. However, if the process 1300 determines that selected intra prediction is good enough, the process 1300 selects (at 1355) the selected intra prediction mode as the encoding mode for the macroblock. After determining the encoding mode for the macroblock, the process 1300 performs (at 1360) an 8×8 transform on the macroblock as described above by reference to FIG. 10.

Finally, the process determines (at 1365) whether any unselected macroblocks in the slice remain. If there are unselected macroblocks in the slice left, the process return to operation 1315 and processes another macroblock in the slice. Therefore, the process 1300 repeats operations 1315-1360 until there are no more macroblocks left in the slice, at which point, the process ends. Although the process 1300 describes the processing of macroblocks for one slice of the video image, the operations 1315-1365 are performed for each slice in the video image.

Figure 14:
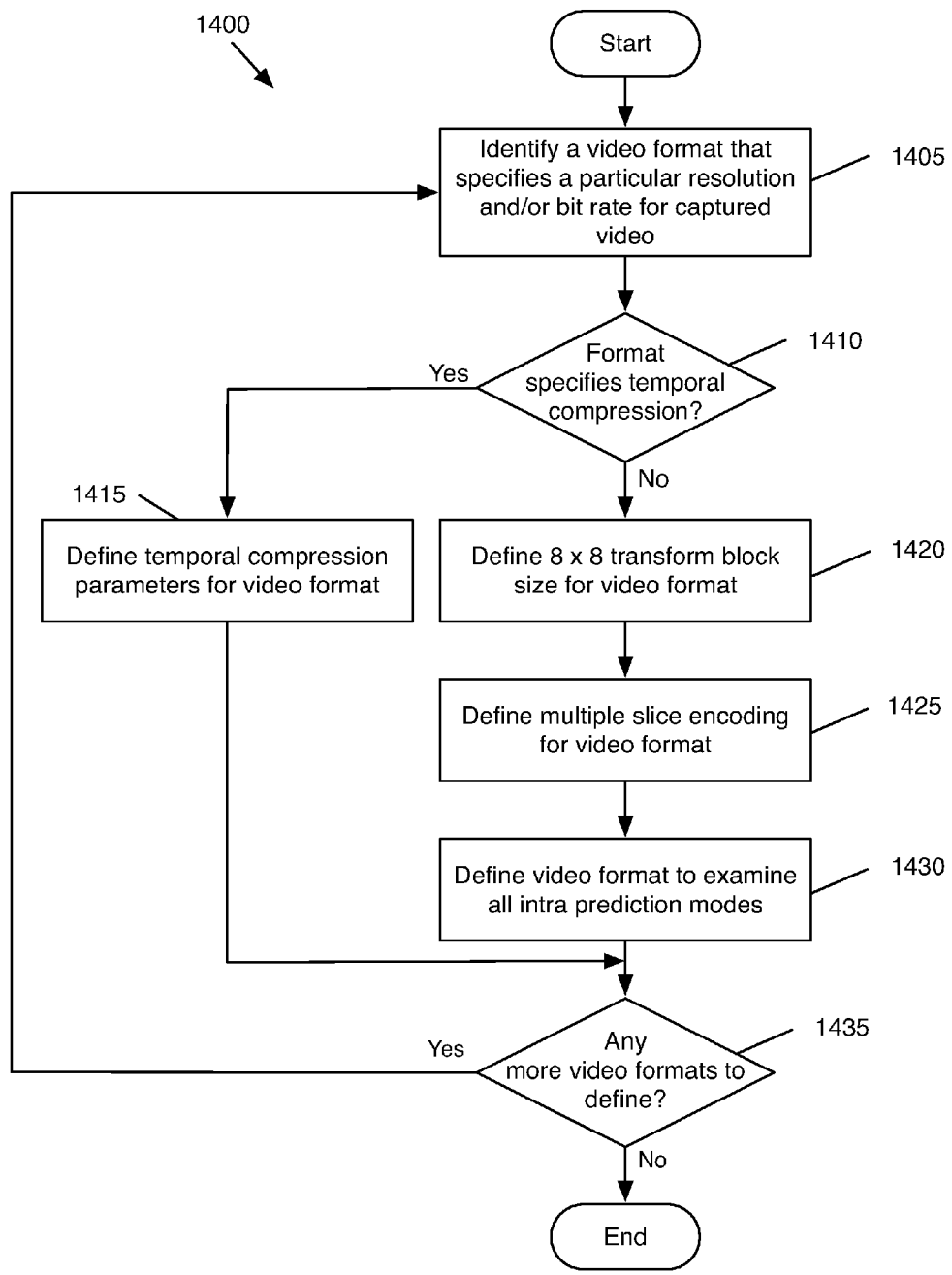
FIG. 14 conceptually illustrates a process for defining different video formats for a video recording device of some embodiments.

FIG. 14 conceptually illustrates a process for defining different video formats for a video recording device of some embodiments. The video recording device provides both temporally compressed and non-temporally compressed video formats in some embodiments.

The process 1400 begins by identifying (at 1405) a video format that specifies a particular resolution and/or bit rate for captured video. Next, the process 1400 determines (at 1410) whether the format specifies temporal compression. If the format specifies temporal compression, the process 1400 defines (at 1415) temporal compression parameters for the video format. In some embodiments, the parameters are based on design choices made by the manufacturers of the video recording device that are intended to maximize video quality for the particular resolution and/or bit rate. If the format does not specify temporal compression, the process proceeds to operation 1420.

At 1420, the process 1400 defines the transform block size to be 8×8 for the video format. The process 1400 then defines (at 1425) multiple slice encoding for the video format. In some embodiments, four slices are defined as the number of slices. However, other embodiments may define a different number of slices for video images encoded using the video format. Next, the process 1400 defines (at 1430) the video format to examine all intra prediction modes. After defining the parameters of the video format, the process 1400 determines (at 1435) whether there are any more video formats to define. If there are additional video formats to define, the process 1400 returns to operation 1405 and defines another video format. The process 1400 repeats the operations 1405-1430 until there are no more video formats to define, after which the process ends.

The section above describes operations of the process 1400 performed in a particular order. However, one of ordinary skill in the art will recognize that the some or all of the operations of the process 1400 can be performed in any order or simultaneously. For example, operations 1420, 1426, 1430 can be performed simultaneously, operations 1425 and 1430 can be performed before operation 1420, or operations 1420 and 1430 can be performed before operation 1425.

D. System

Figure 15:
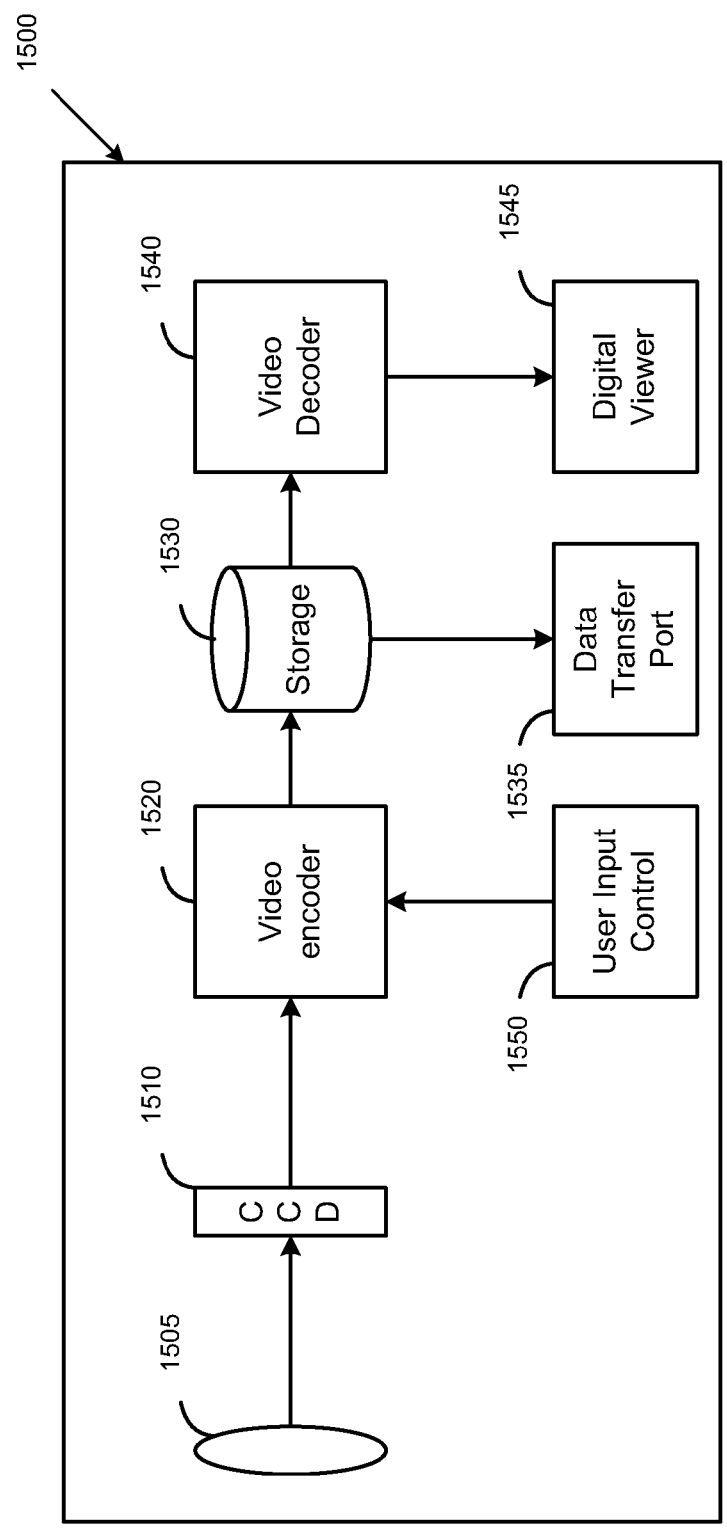
FIG. 15 illustrates a block diagram of a video camera of some embodiments that utilizes video capture, encoding, and storage process of FIG. 8.

FIG. 15 illustrates a block diagram of a video camera 1500 of some embodiments that utilizes the above-described video capture, encoding and storage process. Video camera 1500 may be the same as video camera 700, or may be different in one or more respects. As shown in FIG. 15, the video camera 1500 includes an optical intake 1505, an image sensing circuitry 1510, a video encoder 1520, and a storage device 1530. The video camera in some embodiments further includes a data transfer port 1535, a video decoder 1540, a digital viewer 1545, and a user input control 1550.

Optical images of the outside world enter the video camera 1500 through the optical intake 1505. In some embodiments, the optical intake 1505 includes an aperture and one or more optical lenses. The lenses perform focus, optical zoom or other optical processes on the optical images.

An optical image from the optical intake 1505 is projected onto the image sensing circuitry 1510, which converts the optical image into electronic signals. In some embodiments, the image sensing circuitry 1510 is a charge-coupled device (CCD). A CCD includes a photo active region that includes a two dimensional capacitor array, in which capacitors accumulate electrical charges proportional to the intensity of the light received. Once the array has been exposed to the optical image, a control circuit causes each capacitor to transfer its content to its neighbor or to a charge amplifier, which converts the charge into a voltage. By repeating this process, the CCD samples and digitizes the optical image.

A video encoder 1520 encodes the digitized optical image. Some embodiments implement the video encoder 1520 as a microprocessor executing a set of instructions. Other embodiments implement the video encoder 1520 using one or more electronic devices such as application specific integrated circuits (ASICs), field programmable gate arrays (FPGAs), or other types of circuits.

In some embodiments, the video encoder 1520 is a H.264 MPEG-4 encoder, which uses prediction and discrete cosine transform to remove redundancies from the images. Some embodiments remove both spatial and temporal redundancies, while other embodiments remove only spatial redundancies or do not remove any redundancy. Some embodiments of the video encoder further use entropy encoding to produce a compressed bitstream from the encoded image.

A storage device 1530 stores the encoded image. In some embodiments, the storage device 1530 is a flash memory device, a hard disk or other type of non-volatile memory device capable of storing digital information such as the encoded image. The storage device is removable (e.g., a removable flash drive) in some embodiments. The stored encoded image can then be transferred out of the video camera 1500 using a data transfer port 1535.

The data transfer port 1535 transfers image or other data between the storage device 1530 of the video camera 1500 and an external device such as computer. In some embodiments, the data transfer port 1535 uses high throughput protocols such as Universal Serial Bus (USB) or IEEE 1394 interface (FireWire) to communicate with the computer. The data transfer port 1535 may also communicate with a computer using any other wired or wireless data communication protocol.

A user input control 1550 allows a user to adjust settings of various components of the video camera 1500. In some embodiments, the user input control 1550 is implemented as physical buttons on the video camera. Alternatively, or conjunctively, some embodiments include a GUI, which allows the user to navigate through various settings of the video camera graphically. In some embodiments, the user input control 1550 allows the user to adjust the settings of video decoder 1520. For example, a user may set the video decoder to encode the image using any encoding modes included in the H.264 standard, or a user may set the video encoder 1520 to use only I-frames or other subsets of the H.264 standard.

Some embodiments include a video decoder 1540 so a user may view the encoded image. The video decoder 1540 is able to decode the image encoded by the video encoder 1520 and stored on storage device 1530. In some embodiments, the video decoder 1540 is part of the video encoder 1520 because some embodiments of the video encoder 1520 include a video decoder in order to produce an H.264 compliant encoded video sequence. The digital viewer 1545 displays the video image decoded by the video decoder 1540. In some embodiments, the digital viewer is implemented as part of a GUI associated with user input control 1550.

II. Media-Editing Application

Some embodiments provide a media-editing application for importing and editing digital video that has the ability to differentiate between different formats of incoming digital video. When temporally compressed digital video is imported, the media-editing application transcodes the digital video and stores the transcoded video in storage. When non-temporally compressed digital video is imported, the media-editing application recognizes this format and stores the incoming video directly into storage without transcoding.

Figure 16:
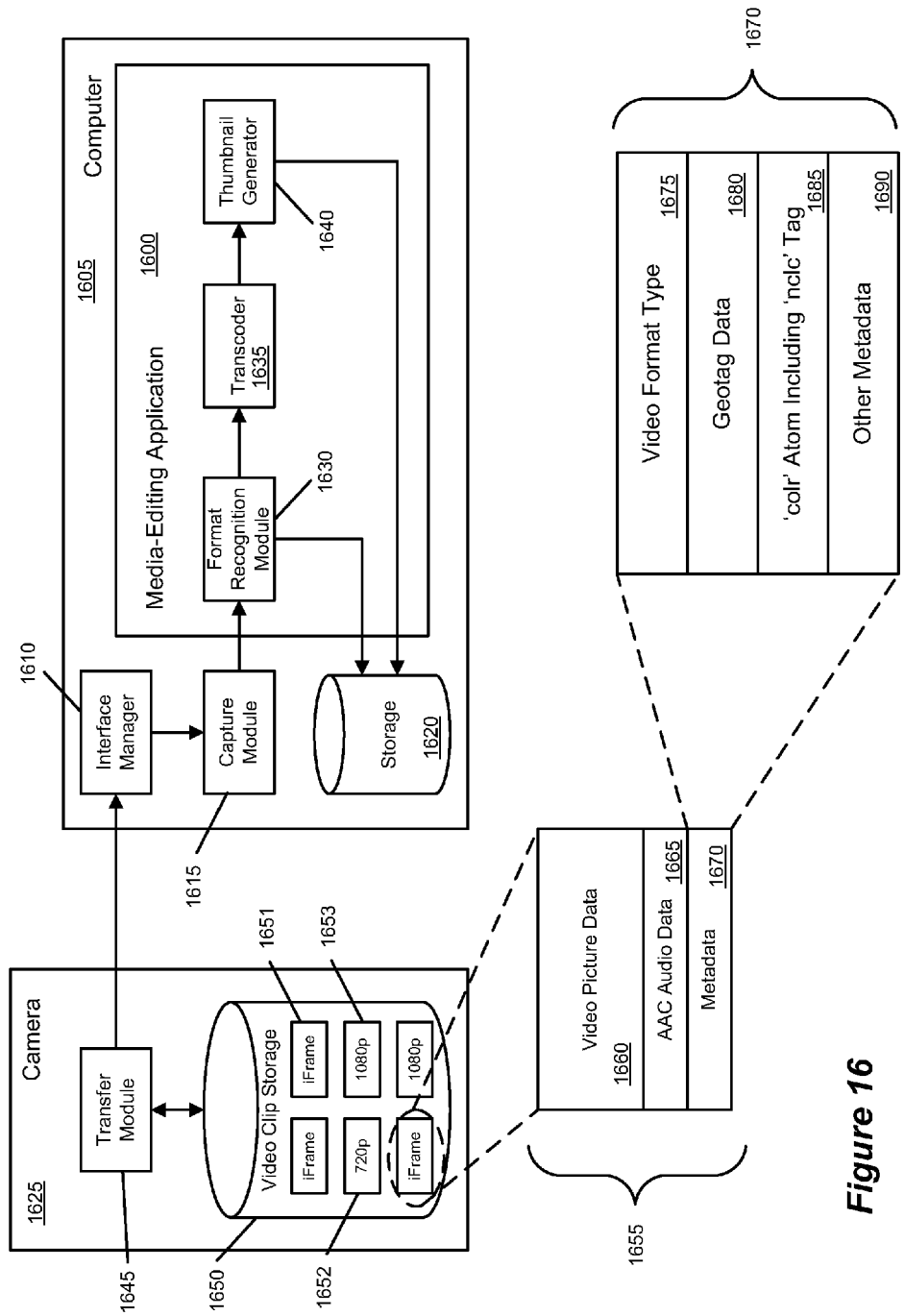
FIG. 16 illustrates a media-editing application of some embodiments for importing and editing digital video that has the ability to differentiate between different formats of incoming digital video.

FIG. 16 illustrates such a media-editing application 1600 of some embodiments. Some examples of such media-editing applications include iMovie® and Final Cut Pro®, both sold by Apple Inc.® Media-editing application 1600 is on a computer 1605. In some embodiments, computer 1605 may be a computer dedicated specifically to media-editing or may be a computer that includes numerous other programs (e.g., word processor, web browser, computer gaming applications, etc.).

In addition to media-editing application 1600, computer 1605 also includes interface manager 1610 and capture module 1615, as well as a storage 1620. The interface manager 1610 receives a digital video stream from a digital video source. Camera 1625, described below, is one example of such a digital video source. In some embodiments, the interface manager is an input driver (e.g., a FireWire input driver, a USB input driver, etc.) that receives the video stream through a port of the computer (e.g., a FireWire port, a USB port, etc.) that is connected to the digital video source (e.g., through a FireWire or USB cable, directly via a USB port, wirelessly, etc.).

The interface manager 1610 relays the received video stream to the capture module 1615, which in some embodiments funnels the video stream from the low-level port manager (the interface manager 1610) to the media-editing application 1600. In some embodiments, this capture module 1615 is part of the QuickTime® Engine of Apple Inc.® In some embodiments, the capture module 1615 is actually a part of media-editing application 1600. Storage 1620 stores video clips received from the digital video source. Storage 1620 is part of the media-editing application 1600 in some embodiments as well. For instance, storage 1620 may be a library of the media-editing application. In other embodiments, the storage is, as shown, part of the computer 1605. Storage 1620 may store more than just video clips in some embodiments. For instance, storage 1620 may also store executable or other files associated with the media-editing application 1600 or other applications residing on computer 1605.

Media-editing application 1600 includes format recognition module 1630, transcoder 1635, and thumbnail generator 1640. One of ordinary skill in the art will recognize that the media-editing application of some embodiments will include other modules not shown in this diagram, such as editing modules, a rendering engine, etc.

Format recognition module 1630 receives a digital video clip from capture module 1615 upon import and identifies the format of the digital video. In some embodiments, this identification determines whether the digital video is temporally compressed. The format recognition module 1630 examines metadata of the digital video clip in some embodiments in order to identify the format (see the description of the structure of a video clip below for further discussion of the metadata). In some embodiments, the metadata indicates whether the digital video is in an iFrame (non-temporally compressed) format or a different format that uses temporal compression. In some embodiments, the format recognition module is able to identify the formats of the various video clips as soon as the camera is connected to the computer 1605.

When the format recognition module 1630 identifies that the incoming digital video clip is not temporally compressed and therefore does not need to be transcoded, the format recognition module 1630 routes the video clip directly to storage 1620. As mentioned above, this may be the library of the media-editing application 1600 or it may be a storage on computer 1605 that is shared by multiple applications. The speed of importing such a digital video clip is tied to the size of the video clip file and the connection speed between the camera and the computer in some embodiments, and is not tied to transcoding of the clip or playback speed of the clip. Specifically, because there is no transcoding, the import speed is not tied to the processing power required for decoding and/or encoding. Furthermore, when the digital video clip is stored in random access storage on the camera, the import speed is not related to any playback speed of the video clip that is due to reading from a tape-based storage which requires playback of the tape such that 30 minutes are required to import 30 minutes of video. Some embodiments, rather than directly routing the video clip to storage 1620, decode the incoming video clip in order to remove spatial compression.

When the format recognition module 1630 identifies that the incoming digital video is temporally compressed, the digital video is routed to transcoder 1635. Transcoder 1635, in some embodiments, decodes the digital video and re-encodes the video with only spatial compression. Thus, the output of the transcoder 1635 is non-temporally compressed video. This transcoding process will generally take substantially more time than for a non-temporally compressed video clip of equivalent length. In some embodiments, the transcoder decodes the video and does not re-encode it.

The transcoder output (non-temporally compressed video) is sent to the thumbnail generator 1640 in some embodiments. The thumbnail generator 1640 generates thumbnails for each digital video picture in the video clip. The thumbnails are stored in storage 1620 along with the video clip. Some embodiments also send non-temporally compressed incoming video clips from the format recognition module 1630 to the thumbnail generator 1640 as an intermediate step before storage. Furthermore, some embodiments do not include a thumbnail generator and thus do not store thumbnails with the video clip.

As mentioned above, in some embodiments the digital video stream is received from a camera 1625. Camera 1625 may be a camera such as digital video camera 700 in some embodiments. The camera 1625 includes a transfer module 1645 and a video clip storage 1650. The video clip storage includes numerous video clips that are stored in different formats. For instance, clip 1651 is stored in a non-temporally compressed format, clip 1652 is stored in 720p temporally compressed format, and clip 1653 is stored in 1680p temporally compressed format. As illustrated above in Section I, some embodiments allow a user to select the recording format of each video clip captured by the camera. As illustrated in this figure and described below, some embodiments store the video format as metadata.

Transfer module 1645, in some embodiments, is an output driver associated with an output port (e.g., a FireWire or USB port) of the camera 1625. In some embodiments, a user interacting with the video camera either through the user interface of the camera or the user interface of media-editing application 1600 (when the camera is connected to computer 1605) instructs the camera 1625 to transfer a particular video clip to the media-editing application 1600. The clip is then transferred to the computer 1605 via the transfer module 1645.

FIG. 16 also illustrates the format of video file 1655 of some embodiments that is stored on camera 1625. Video file 1655 is an example of a non-temporally compressed video clip. Video file 1655 includes video picture data 1660, Advanced Audio Coding (AAC) audio data 1665, and metadata 1670. The video picture data includes the non-temporally compressed video frames in this example, and in the case of clip 1652 would include temporally compressed video frame data. The AAC audio data 1665 is a particular format of audio that is required by media-editing application in some embodiments. Other embodiments allow different forms of encoded audio data such as linear pulse-code modulation (LPCM) audio, for example.

As illustrated, metadata 1670 includes video format type 1675, geotag data 1680, a 'colr' atom 1685, and other metadata 1690. The video format type 1675 indicates the encoding format of the video. That is, format type 1675 indicates whether the video is in iFrame format (non-temporally compressed) and may also indicate the resolution and/or bit rate of the video. In some embodiments, the media-editing application 1600 requires that the bit rate be below a particular threshold for iFrame format data (e.g., 24 Mbps) while maintaining a particular threshold quality at a given resolution.

Geotag data 1680, in some embodiments, indicates GPS coordinates or other geographical location information about where the video clip was shot. This information is based on a geolocator module (e.g., a GPS receiver) in the camera. The 'colr' atom 1685 is used to properly convert between color spaces of different display devices in some embodiments. Specifically, the 'colr' atom indicates that a software gamma color space conversion should be used. The 'nclc' tag in the 'colr' atom is used in some embodiments to identify that the color space conversion can go through either a software or hardware path (e.g., on playback of the video clip).

Some embodiments store other metadata 1690 with the video clip as well. This metadata may include lighting information about the lighting when the video clip was captured, cadence and frame rate (e.g., 25, 30, etc. frames per second) information about the video clip, bit depth (e.g., 8 bit) information, etc. In some embodiments, when the video clip is transferred to media-editing application 1600, metadata 1670 is transferred along with it and is used by the media-editing application. For instance, some embodiments of the format recognition module 1630 determine the video format type from the metadata 1670.

Some embodiments of the media-editing application specify requirements for acceptable non-temporally compressed video. For instance, some embodiments specify that the video encoding and compression comport to the H.264 encoding scheme using either Baseline, Main, or High Profile encoding. The different profiles are different sets of capabilities in some embodiments. Some embodiments also specify that the entropy encoder on the camera (e.g., unit 725 of FIG. 7) use either Context-based Adaptive Variable Length Coding (CAVLC) or Context-based Adaptive Binary Arithmetic Coding (CABAC). Some embodiments specify other requirements, such as the frame rate (e.g., only 25 or 30 fps), the bit depth (e.g., 8 bit), the file format (e.g., .mp4 or .mov), the color tagging (e.g., that the 'colr' atom with the 'nclc' color parameter type must be present, maximum bit rate (e.g., 24 Mbps), etc.

Figure 17:
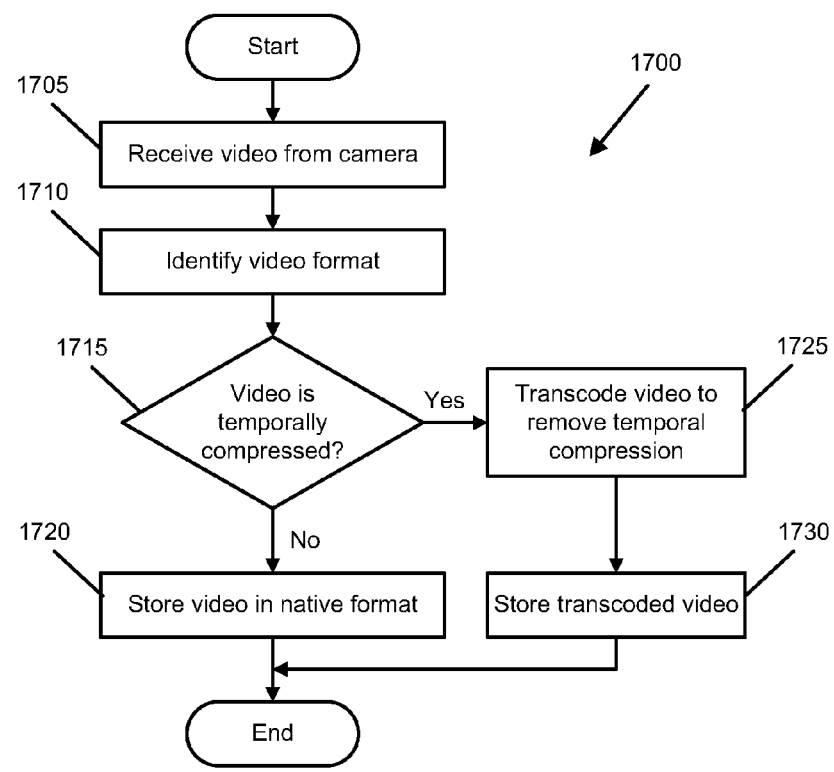
FIG. 17 conceptually illustrates a process of some embodiments for storing a video clip imported into a computer from a digital video source.

FIG. 17 conceptually illustrates a process 1700 of some embodiments for storing a video clip imported into a computer from a digital video source such as camera 1625. The process 1700 is performed by a media-editing application in some embodiments (e.g., application 1600). The process begins by receiving (at 1705) a video clip from the digital video source. The receiving of the video clip may be initiated by a user of a computer selecting an import option in a user interface or dragging a video clip icon from a camera folder to a computer folder. For instance, when the video is stored on the camera in a random-access storage (e.g., hard disk, flash memory, etc.), a user can open a folder on the computer for the video camera and view an icon for each of the video files on the camera. The user can use a cursor controller to drag the icon for a desired video clip to a folder on the computer in order to initiate the transfer. The receiving of the video clip may also be automatically initiated by the attachment of the camera to an input port of the computer, etc.

The process then identifies (at 1710) the video format of the video clip. As mentioned above, in some embodiments, the video camera encodes and stores the video clip in a number of different formats. For instance, the video camera may encode the video clip by performing only spatial compression, or encode the video clip by performing both spatial and temporal compression. In some embodiments, the process identifies the video format based on metadata stored on the camera and transferred with the video clip that indicates the video format. Other embodiments recognize the type of encoding by examining the video picture data.

Process 1700 then determines (at 1715) whether the video is temporally compressed. This is based on the identification of the video format. When the video is not temporally compressed, the process stores (at 1720) the video clip in its native format. That is, no transcoding is required when the video is not temporally compressed and the video clip can be stored instantly without any processing.

When the video is temporally compressed, the process transcodes (at 1725) the video to remove temporal compression. As described above, the transcoding process of some embodiments decodes the video and then re-encodes the video using only spatial compression. This transcoding operation is computation-intensive and time-intensive. The process then stores (at 1730) the transcoded video. After storing the video (either in native or transcoded format), process 1700 then ends.

III. Computer System

Many of the above-described features and applications are implemented as software processes that are specified as a set of instructions recorded on a computer readable storage medium (also referred to as computer readable medium). When these instructions are executed by one or more computational element(s) (such as processors or other computational elements like ASICs and FPGAs), they cause the computational element(s) to perform the actions indicated in the instructions. Computer is meant in its broadest sense, and can include any electronic device with a processor. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs when installed to operate on one or more computer systems define one or more specific machine implementations that execute and perform the operations of the software programs.

Figure 18:
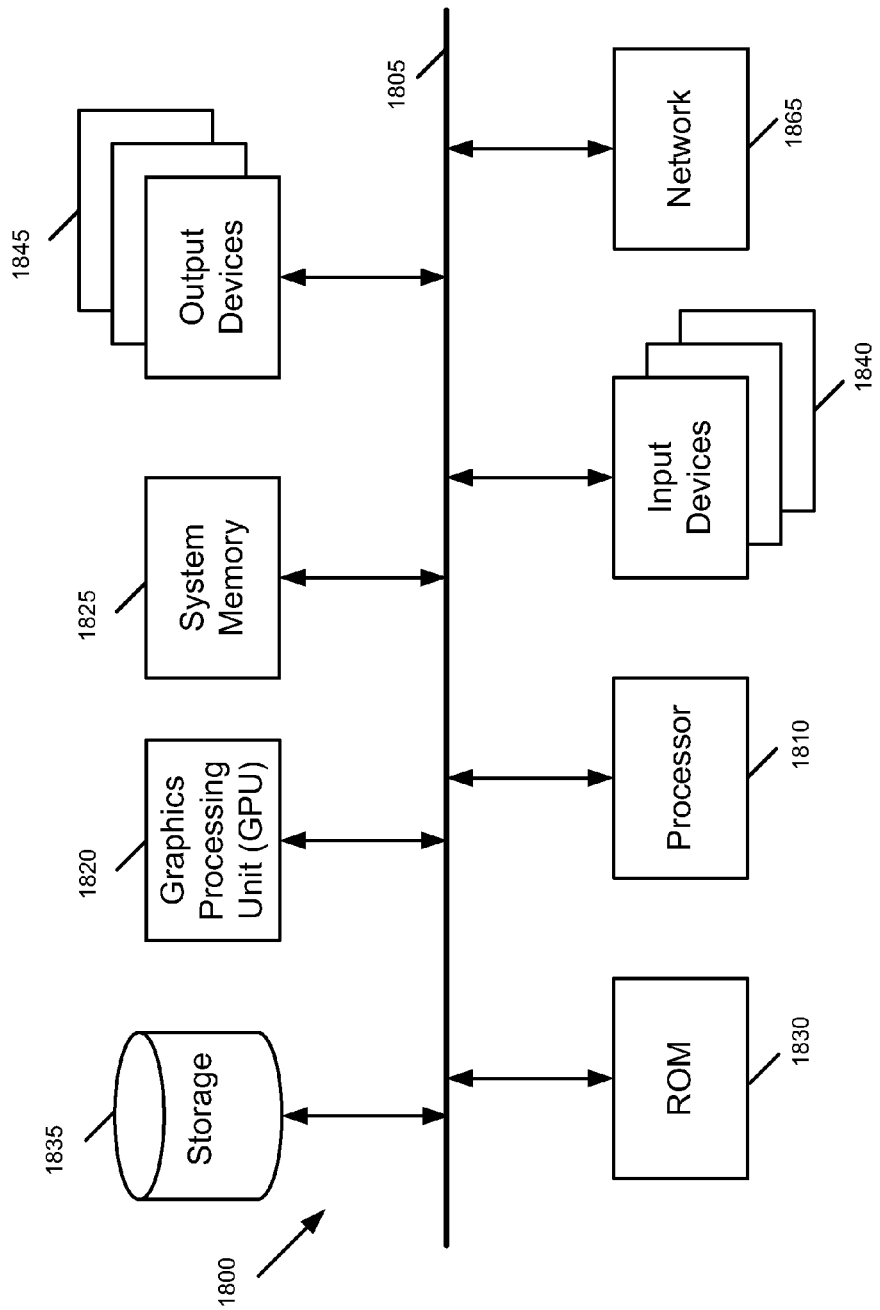
FIG. 18 illustrates a computer system with which some embodiments of the invention are implemented.

FIG. 18 illustrates a computer system with which some embodiments of the invention are implemented. Such a computer system includes various types of computer readable media and interfaces for various other types of computer readable media. One of ordinary skill in the art will also note that the digital video camera of some embodiments also includes various types of computer readable media. Computer system 1800 includes a bus 1805, a processor 1810, a graphics processing unit (GPU) 1820, a system memory 1825, a read-only memory 1830, a permanent storage device 1835, input devices 1840, and output devices 1845.

The bus 1805 collectively represents all system, peripheral, and chipset buses that communicatively connect the numerous internal devices of the computer system 1800. For instance, the bus 1805 communicatively connects the processor 1810 with the read-only memory 1830, the GPU 1820, the system memory 1825, and the permanent storage device 1835.

From these various memory units, the processor 1810 retrieves instructions to execute and data to process in order to execute the processes of the invention. In some embodiments, the processor comprises a Field Programmable Gate Array (FPGA), an ASIC, or various other electronic components for executing instructions. Some instructions are passed to and executed by the GPU 1820. The GPU 1820 can offload various computations or complement the image processing provided by the processor 1810. In some embodiments, such functionality can be provided using CoreImage's kernel shading language.

The read-only-memory (ROM) 1830 stores static data and instructions that are needed by the processor 1810 and other modules of the computer system. The permanent storage device 1835, on the other hand, is a read-and-write memory device. This device is a non-volatile memory unit that stores instructions and data even when the computer system 1800 is off. Some embodiments of the invention use a mass-storage device (such as a magnetic or optical disk and its corresponding disk drive) as the permanent storage device 1835.

Other embodiments use a removable storage device (such as a floppy disk, flash drive, or ZIP® disk, and its corresponding disk drive) as the permanent storage device. Like the permanent storage device 1835, the system memory 1825 is a read-and-write memory device. However, unlike storage device 1835, the system memory is a volatile read-and-write memory, such a random access memory. The system memory stores some of the instructions and data that the processor needs at runtime. In some embodiments, the invention's processes are stored in the system memory 1825, the permanent storage device 1835, and/or the read-only memory 1830. For example, the various memory units include instructions for processing multimedia items in accordance with some embodiments. From these various memory units, the processor 1810 retrieves instructions to execute and data to process in order to execute the processes of some embodiments.

The bus 1805 also connects to the input and output devices 1840 and 1845. The input devices enable the user to communicate information and select commands to the computer system. The input devices 1840 include alphanumeric keyboards and pointing devices (also called "cursor control devices"). The output devices 1845 display images generated by the computer system. The output devices include printers and display devices, such as cathode ray tubes (CRT) or liquid crystal displays (LCD).

Finally, as shown in FIG. 18, bus 1805 also couples computer 1800 to a network 1865 through a network adapter (not shown). In this manner, the computer can be a part of a network of computers (such as a local area network ("LAN"), a wide area network ("WAN"), or an Intranet, or a network of networks, such as the internet. Any or all components of computer system 1800 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processor and includes sets of instructions for performing various operations. Examples of hardware devices configured to store and execute sets of instructions include, but are not limited to application specific integrated circuits (ASICs), field programmable gate arrays (FPGA), programmable logic devices (PLDs), ROM, and RAM devices. Examples of computer programs or computer code include machine code, such as is produced by a compiler, and files including higher-level code that are executed by a computer, an electronic component, or a microprocessor using an interpreter.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 8 and 11) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

The invention claimed is:

1. A method comprising:
   at a video recording device, receiving a video clip comprising a plurality of video images;
   identifying a plurality of video formats comprising a first video format for encoding video images at least partially in an interframe format and a second video format for encoding video images in an intraframe only format;
   encoding a video image using the second video format by:
      assigning a plurality of slices of the video image to a plurality of processing units of the video recording device; and
      encoding the plurality of slices using the second video format, wherein at least two of the slices in the plurality of slices are encoded simultaneously using two different processing units of the video recording device.

2. The method of claim 1 further comprising defining a graphical user interface for the video recording device, the graphical user interface for enabling a user to select between the first and second video formats.

3. The method of claim 1, wherein each of the video images encoded using the second video format is encoded as a same number of slices.

4. The method of claim 1, wherein the second video format has a resolution of 1280×720.

5. The method of claim 1, wherein each video image comprises a particular width, wherein the method further comprises reducing the particular width of each video image prior to encoding the plurality of slices of the video image using the second video format.

6. A non-transitory computer readable medium of a video recording device, the computer readable medium storing a computer program which when executed by at least one processor of the video recording device captures a video clip, the computer program comprising sets of instructions for:
    receiving a selection of a non-temporally compressed encoding scheme from a plurality of different encoding schemes for encoding the video clip, the different encoding schemes comprising at least one temporally compressed encoding scheme and at least the selected non-temporally compressed encoding scheme;
    capturing the video clip as a plurality of video frames;
    encoding a video frame using the selected non-temporally compressed encoding scheme by:
        assigning a plurality of slices of the video frame to a plurality of processing units of the video recording device; and
        non-temporally encoding the plurality of slices, wherein at least two of the slices in the plurality of slices are non-temporally encoded simultaneously using two different processing units of the video recording device; and
    storing the video clip in a storage of the video recording device.

7. The non-transitory computer readable medium of claim 6, wherein the temporally compressed encoding scheme is an encoding scheme in which at least one video frame of a captured video clip is encoded with reference to at least one other video frame of the video clip and the non-temporally compressed encoding scheme is an encoding scheme in which each video frame of a captured video clip is encoded without reference to any other video frames of the video clip.

8. The non-transitory computer readable medium of claim 6 further comprising appending geolocation metadata to the video clip indicating a location at which the video clip was captured.

9. The non-transitory computer readable medium of claim 6 further comprising a set of instructions for reducing a particular width of each video image prior to non-temporally encoding the plurality of slices of the video frame.

10. The non-transitory computer readable medium of claim 9, wherein the set of instructions for non-temporally encoding comprises sets of instructions for:
    dividing each frame into a plurality of 8×8 macroblocks; and
    performing a discrete cosine transform on each of the 8×8 macroblocks.

11. The non-transitory computer readable medium of claim 6, wherein the storage comprises one of a flash memory and a hard disk.

12. A non-transitory computer readable medium of a video recording device, the computer readable medium storing a computer program which when executed by at least one processor of the video recording device captures a video clip, the computer program comprising sets of instructions for:
    receiving a video clip captured by the video recording device as a set of video images, each video image having a particular width;
    reducing the width of the video images captured by the video recording device;
    after the width of the video images captured by the video recording device has been reduced, encoding each of the reduced-width video images without reference to any other video image captured by the video recording device, wherein each of the reduced-width video images is encoded as a plurality of slices using a plurality of processing units of the video recording device; and
    storing the reduced-width video images in a storage of the video recording device.

13. The non-transitory computer readable medium of claim 12, wherein the set of instructions for encoding the reduced-width video images comprises a set of instructions for performing all intra prediction modes for each 4×4 array of the reduced-width video images.

14. The non-transitory computer readable medium of claim 13, wherein the set of instructions for performing an intra prediction mode for a particular 4×4 array comprises a set of instructions for comparing the particular 4×4 array to a previously encoded 4×4 array.

15. The non-transitory computer readable medium of claim 12, wherein the set of instructions for encoding the reduced-width video images comprises sets of instructions for:
    dividing each reduced-width video image into a plurality of 8×8 macroblocks; and
    performing a discrete cosine transform on each of the 8×8 macroblocks.

16. The non-transitory computer readable medium of claim 12, wherein the storage comprises a flash memory.

17. The non-transitory computer readable medium of claim 12, wherein the storage comprises a hard disk.

\* \* \* \* \*